US010029415B2

(12) United States Patent
Swanson et al.

(10) Patent No.: US 10,029,415 B2
(45) Date of Patent: Jul. 24, 2018

(54) PRINT HEAD NOZZLE FOR USE WITH ADDITIVE MANUFACTURING SYSTEM

(75) Inventors: William J. Swanson, St. Paul, MN (US); Dominic F. Mannella, Minnetonka, MN (US); Kevin C. Johnson, Minneapolis, MN (US); Ronald G. Schloesser, New Brighton, MN (US)

(73) Assignee: Stratasys, Inc., Eden Prairie, MN (US)

( * ) Notice: Subject to any disclaimer, the term of this patent is extended or adjusted under 35 U.S.C. 154(b) by 854 days.

(21) Appl. No.: 13/587,002

(22) Filed: Aug. 16, 2012

(65) Prior Publication Data

US 2014/0048969 A1 Feb. 20, 2014

(51) Int. Cl.
*B29C 47/04* (2006.01)
*B29C 67/00* (2017.01)
(Continued)

(52) U.S. Cl.
CPC ........ *B29C 67/0055* (2013.01); *B29C 64/106* (2017.08); *B29C 64/118* (2017.08); *B29C 64/171* (2017.08); *B29C 64/209* (2017.08); *B33Y 10/00* (2014.12); *B33Y 30/00* (2014.12); *B29C 47/0009* (2013.01); *B29C 47/02* (2013.01); *B29C 47/065* (2013.01);
(Continued)

(58) Field of Classification Search
CPC ............ B29C 67/0055; B29C 67/0085; B29C 47/0009; B29C 2947/92904; B29C 2947/92409; B29C 64/106; B29C 64/118; B29C 64/171; B29C 64/209; B33Y 30/00; B33Y 50/02

USPC ......... 425/461, 375, 190, 192 R, 113, 378.1; 264/308; 392/480; 347/21
See application file for complete search history.

(56) References Cited

U.S. PATENT DOCUMENTS 4,567,489 A * 1/1986 Obstfelder ................. B41J 2/35
219/543
4,728,392 A * 3/1988 Miura ..................... B41J 2/1606
216/27
(Continued)

FOREIGN PATENT DOCUMENTS

DE 102010015451 A1 10/2011
GB 816016 7/1959
(Continued)

OTHER PUBLICATIONS

Chinese Office Action dated Sep. 1, 2015 for corresponding Chinese Application No. 201380043584.4, filed Feb. 15, 2015.
(Continued)

*Primary Examiner* — Yogendra N Gupta
*Assistant Examiner* — Ninh Le
(74) *Attorney, Agent, or Firm* — Peter J. Ims; Westman, Champlin & Koehler, P.A.

(57) ABSTRACT

A nozzle for printing three-dimensional parts with an additive manufacturing system, the nozzle comprising a nozzle body having an inlet end and a tip end offset longitudinally from the inlet end, a tip pipe for extruding a flowable material, an inner ring extending circumferentially around the tip pipe at the outlet end, an outer ring extending circumferentially around the inner ring, at least one annular recessed groove located circumferentially between the inner ring and the outer ring.

11 Claims, 16 Drawing Sheets

(51) Int. Cl.
| | |
|---|---|
| *B33Y 10/00* | (2015.01) |
| *B29C 64/106* | (2017.01) |
| *B29C 64/209* | (2017.01) |
| *B29C 64/118* | (2017.01) |
| *B29C 64/171* | (2017.01) |
| *B33Y 30/00* | (2015.01) |
| *B29C 47/00* | (2006.01) |
| *B29C 47/02* | (2006.01) |
| *B29C 47/06* | (2006.01) |
| *B29C 47/08* | (2006.01) |

(52) U.S. Cl.
CPC *B29C 47/0866* (2013.01); *B29C 2947/92076* (2013.01); *B29C 2947/92409* (2013.01); *B29C 2947/92571* (2013.01); *B29C 2947/92904* (2013.01)

(56) References Cited

U.S. PATENT DOCUMENTS

| | | | |
|---|---|---|---|
| 5,121,329 A | 6/1992 | Crump | 364/468 |
| 5,169,081 A | 12/1992 | Goedderz | 242/54 |
| 5,303,141 A | 4/1994 | Batchelder et al. | 364/149 |
| 5,312,224 A | 5/1994 | Batchelder et al. | 415/73 |
| 5,340,443 A | 8/1994 | Crump | 156/578 |
| 5,370,467 A * | 12/1994 | Ikehata | B41J 2/275 101/93.05 |
| 5,503,785 A | 4/1996 | Crump et al. | 264/40.7 |
| 5,738,817 A | 4/1998 | Danforth et al. | 264/603 |
| 5,764,521 A | 6/1998 | Batchelder et al. | 364/475.01 |
| 5,866,058 A | 2/1999 | Batchelder et al. | 264/237 |
| 5,900,207 A | 5/1999 | Danforth et al. | |
| 5,939,008 A | 8/1999 | Comb et al. | 264/308 |
| 5,968,561 A | 10/1999 | Batchelder et al. | 425/375 |
| 5,975,493 A | 11/1999 | Ellingson et al. | |
| 6,004,124 A | 12/1999 | Swanson et al. | 425/375 |
| 6,022,207 A | 2/2000 | Dahlin et al. | 425/145 |
| 6,054,077 A | 4/2000 | Comb et al. | 264/40.7 |
| 6,067,480 A | 5/2000 | Stuffle et al. | 700/109 |
| 6,070,107 A | 5/2000 | Lombardi et al. | 700/119 |
| 6,085,957 A | 7/2000 | Zinniel et al. | 226/8 |
| 6,129,872 A | 10/2000 | Jang | 264/75 |
| 6,193,923 B1 | 2/2001 | Leyden et al. | |
| 6,228,923 B1 | 5/2001 | Lombardi et al. | 524/425 |
| 6,257,517 B1 | 7/2001 | Babish et al. | 242/365.6 |
| 6,505,089 B1 | 1/2003 | Yang et al. | |
| 6,547,995 B1 | 4/2003 | Comb | 264/40.1 |
| 6,645,412 B2 | 11/2003 | Priedeman, Jr. | 264/219 |
| 6,685,866 B2 | 2/2004 | Swanson et al. | 264/308 |
| 6,722,872 B1 | 4/2004 | Swanson et al. | 425/225 |
| 6,730,252 B1 | 5/2004 | Teoh et al. | 264/178 |
| 6,749,414 B1 | 6/2004 | Hanson et al. | 425/130 |
| 6,790,403 B1 | 9/2004 | Priedeman, Jr. et al. | 264/442 |
| 6,814,907 B1 | 11/2004 | Comb | 264/40.07 |
| 6,869,559 B2 | 3/2005 | Hopkins | 264/489 |
| 6,923,634 B2 | 8/2005 | Swanson et al. | 425/169 |
| 6,998,087 B1 | 2/2006 | Hanson et al. | 264/308 |
| 7,122,246 B2 | 10/2006 | Comb et al. | 428/364 |
| 7,172,715 B2 | 2/2007 | Swanson et al. | 264/39 |
| 7,236,166 B2 | 6/2007 | Zinniel et al. | 345/419 |
| 7,384,255 B2 | 6/2008 | LaBossiere et al. | 425/190 |
| 7,604,470 B2 | 10/2009 | LaBossiere et al. | 425/131.1 |
| 7,625,200 B2 | 12/2009 | Leavitt | 425/375 |
| 7,896,209 B2 | 3/2011 | Batchelder et al. | 26/53 |
| 7,938,351 B2 | 5/2011 | Taatjes et al. | 242/171 |
| 7,938,356 B2 | 5/2011 | Taatjes et al. | 242/580 |
| 8,033,811 B2 | 10/2011 | Swanson et al. | 425/375 |
| 8,153,182 B2 | 4/2012 | Comb et al. | 427/8 |
| 8,221,669 B2 | 7/2012 | Batchelder et al. | 264/308 |

| | | | |
|---|---|---|---|
| 2003/0056870 A1 | 3/2003 | Comb et al. | |
| 2004/0182510 A1 | 9/2004 | Pfeifer et al. | |
| 2005/0129941 A1 | 6/2005 | Comb et al. | 428/364 |
| 2006/0158456 A1 | 7/2006 | Zinniel et al. | |
| 2007/0003656 A1 | 1/2007 | LaBossiere et al. | 425/375 |
| 2007/0228590 A1 | 10/2007 | LaBossiere et al. | 264/40.1 |
| 2008/0213419 A1* | 9/2008 | Skubic | B29C 47/6018 425/113 |
| 2009/0035405 A1 | 2/2009 | Leavitt | 425/97 |
| 2009/0263582 A1 | 10/2009 | Batchelder | 427/256 |
| 2009/0273122 A1 | 11/2009 | Batchelder et al. | 264/401 |
| 2009/0274540 A1 | 11/2009 | Batchelder et al. | 414/431 |
| 2010/0005987 A1* | 1/2010 | Shapira | B41J 11/14 101/407.1 |
| 2010/0096072 A1 | 4/2010 | Hopkins et al. | 156/155 |
| 2010/0096485 A1 | 4/2010 | Taatjes et al. | 242/171 |
| 2010/0096489 A1 | 4/2010 | Taatjes et al. | 242/520 |
| 2010/0100224 A1 | 4/2010 | Comb et al. | 700/118 |
| 2010/0283172 A1 | 11/2010 | Swanson | 264/80 |
| 2010/0327479 A1 | 12/2010 | Zinniel et al. | 264/172.14 |
| 2011/0074065 A1* | 3/2011 | Batchelder | B29C 67/0055 264/308 |
| 2011/0076495 A1 | 3/2011 | Batchelder et al. | 428/369 |
| 2011/0076496 A1 | 3/2011 | Batchelder et al. | 428/373 |
| 2011/0117268 A1 | 5/2011 | Batchelder et al. | 427/8 |
| 2011/0121476 A1 | 5/2011 | Batchelder et al. | 264/40.1 |
| 2011/0233804 A1 | 9/2011 | Batchelder et al. | 264/40.4 |
| 2012/0046779 A1 | 2/2012 | Pax et al. | |
| 2012/0067501 A1 | 3/2012 | Lyons | 156/64 |
| 2012/0068378 A1 | 3/2012 | Swanson et al. | 264/308 |
| 2012/0070523 A1 | 3/2012 | Swanson et al. | 425/96 |
| 2012/0161350 A1* | 6/2012 | Swanson | B29C 47/92 264/40.7 |
| 2012/0162305 A1* | 6/2012 | Swanson | B29C 67/0055 347/20 |
| 2012/0162314 A1* | 6/2012 | Swanson | B29C 67/0055 347/37 |
| 2012/0164256 A1 | 6/2012 | Swanson et al. | 425/162 |
| 2012/0164330 A1* | 6/2012 | Swanson | B29C 67/0055 427/258 |
| 2013/0026680 A1 | 1/2013 | Ederer et al. | |
| 2013/0269731 A1* | 10/2013 | Crouch | B05B 15/0258 134/22.12 |

FOREIGN PATENT DOCUMENTS

| | | |
|---|---|---|
| GB | 2410495 A | 8/2005 |
| JP | 2004148198 | 5/2004 |
| KR | 20080072788 | 8/2008 |
| KR | 20120060240 | 6/2012 |

OTHER PUBLICATIONS

U.S. Appl. No. 13/334,910, filed Dec. 22, 2011, entitled "Spool Assembly for Additive Manufacturing System, and Methods of Manufacture and Use Thereof".
U.S. Appl. No. 13/334,921, filed Dec. 22, 2011, entitled "Consumable Assembly with Payout Tube for Additive Manufacturing System".
www.envisiontec.com, "3D-Bioplotter", Datatsheet, Mar. 2011.
International Search Report and Written Opinion dated Nov. 1, 2013, for International Application No. PCT/US2013/055308.
Chinese Office Action dated May 30, 2016 for corresponding Chinese Application No. 201380043584.4, filed Feb. 15, 2015.
Chinese Office Action dated Jan. 27, 2016 for corresponding Chinese Application No. 201380043584.4 filed Feb. 15, 2015.
Supplementary Extended Search Report dated Mar. 3, 2016 for corresponding European Patent Application No. 13829600.9 filed Aug. 16, 2013.

\* cited by examiner

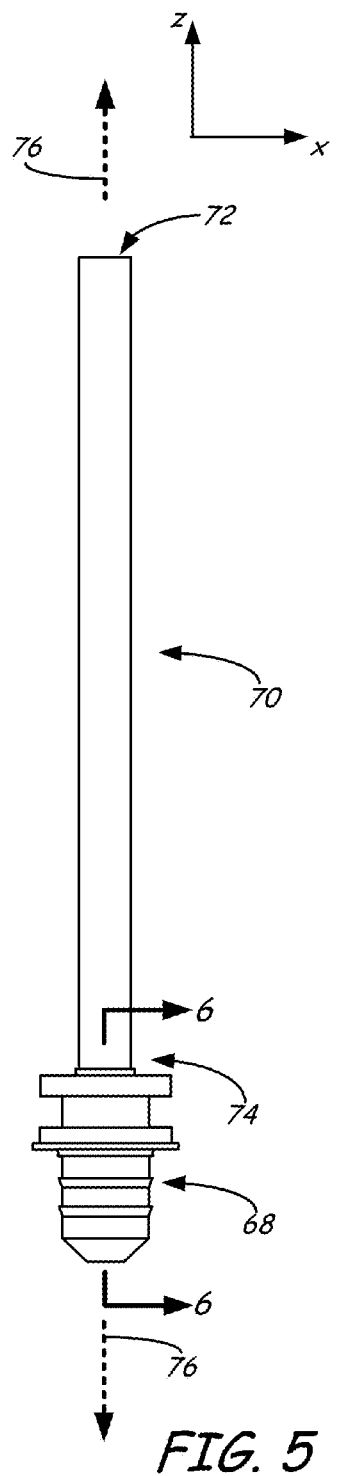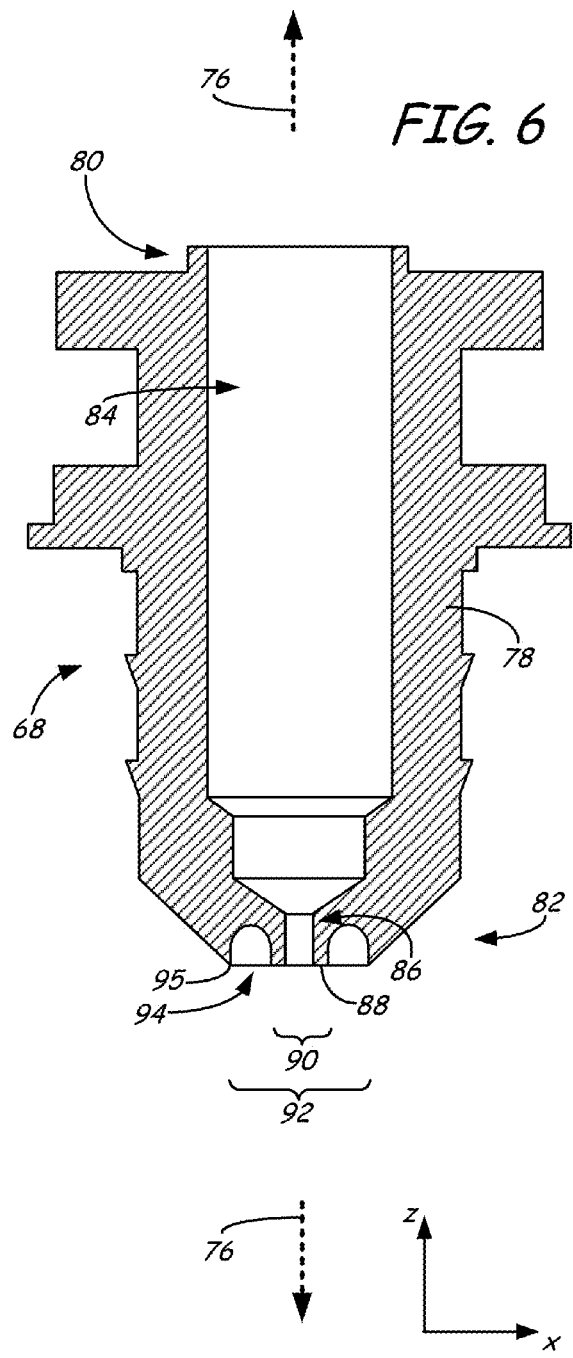

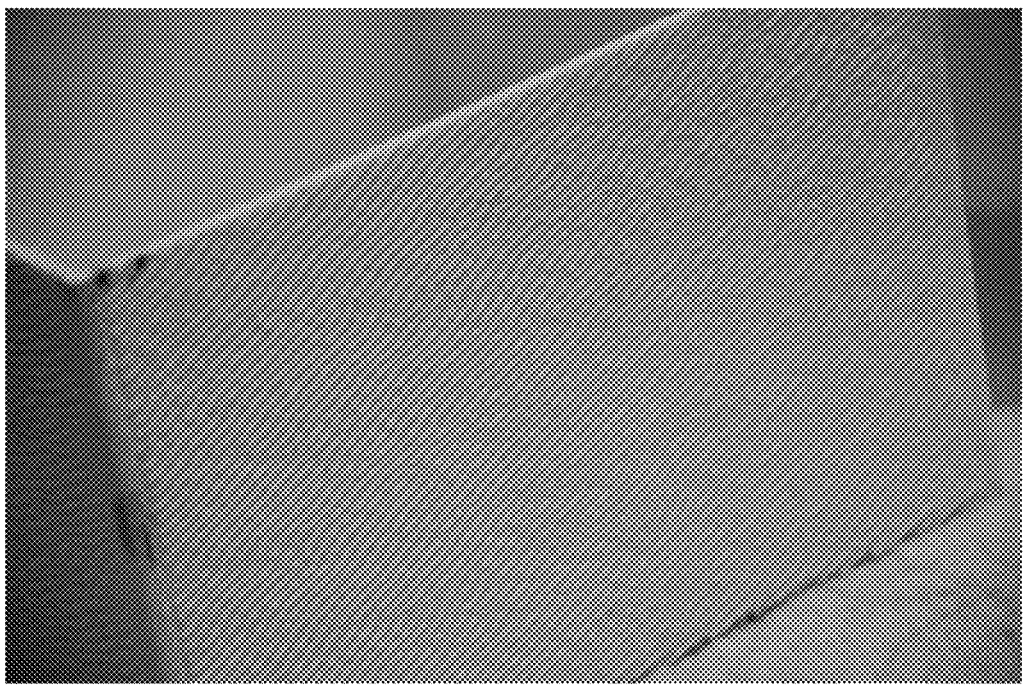
FIG. 20
FIG. 21
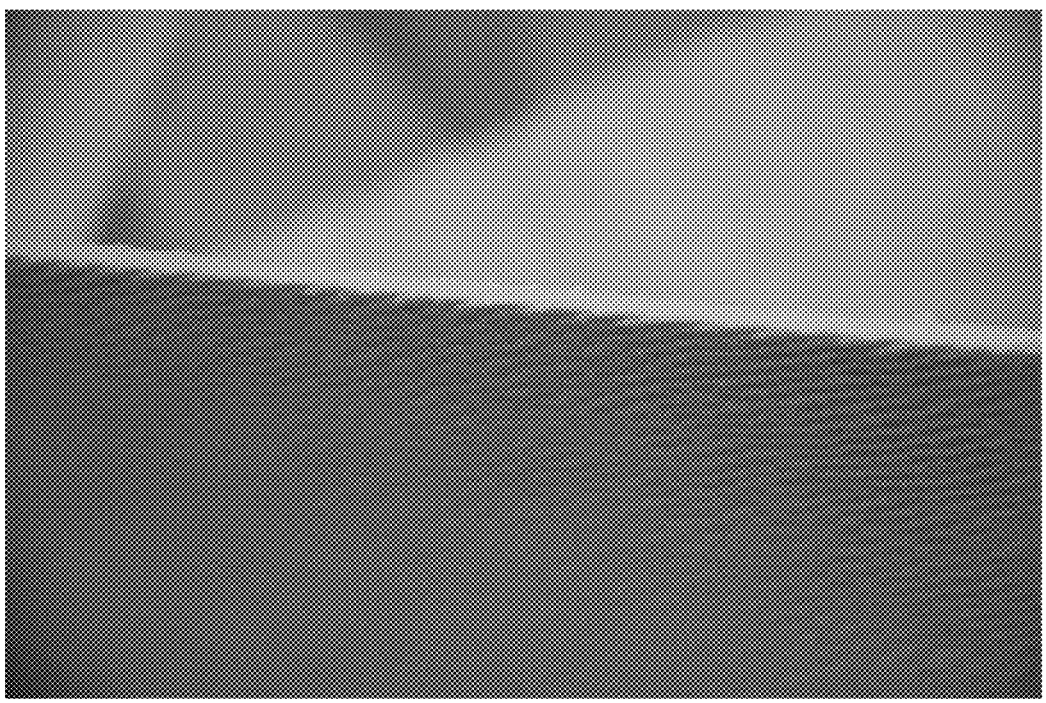

PRINT HEAD NOZZLE FOR USE WITH ADDITIVE MANUFACTURING SYSTEM

CROSS-REFERENCE TO RELATED APPLICATION(S)

Reference is hereby made to co-filed U.S. patent application Ser. No. 13/587,006, entitled "Draw Control For Additive Manufacturing Systems", now U.S. Pat. No. 9,174,388, issued on Nov. 3, 2015.

Reference is also hereby made to co-filed U.S. patent application Ser. No. 13/587,009, entitled "Additive Manufacturing System With Extended Printing Volume, And Methods Of Use Thereof", now U.S. Pat. No. 9,168,697, issued on Oct. 27, 2015.

Reference is also hereby made to co-filed U.S. patent application Ser. No. 13/587,012, entitled "Method For Printing Three-Dimensional Parts With Additive Manufacturing Systems Using Scaffolds", and published as U.S. Patent Application Publication 2014/0052287 A1 on Feb. 20, 2014.

Reference is also hereby made to co-filed U.S. patent application Ser. No. 13/587,015, entitled "Additive Manufacturing Technique For Printing Three-Dimensional Parts With Printed Receiving Surfaces" now U.S. Pat. No. 9,327,350, issued on May 3, 2016.

BACKGROUND

The present disclosure relates to additive manufacturing systems for building three-dimensional (3D) parts with layer-based, additive manufacturing techniques. In particular, the present disclosure relates to print head nozzles for use with extrusion-based additive manufacturing systems, and methods of use thereof.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques, jetting, selective laser sintering, powder/binder jetting, electron-beam melting, and stereolithographic processes. For each of these techniques, the digital representation of the 3D part is initially sliced into multiple horizontal layers. For each sliced layer, one or more tool paths are then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip or nozzle carried by a print head of the system, and is deposited as a sequence of roads on a substrate in an x-y plane while the print head moves along the tool paths. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the part material during fabrication, and is removable from the completed 3D part when the printing process is complete.

SUMMARY

An aspect of the present disclosure is directed to a nozzle for use with a print head in an extrusion-based additive manufacturing system. The nozzle includes an inlet end configured to be secured to a flow channel of the print head, a tip end offset longitudinally from the inlet end, and a tip pipe extending longitudinally at least part way between the inlet end to the tip end. The nozzle also includes an inner ring located at the tip end, where the inner ring has an inner diameter at the tip pipe, an outer ring located at the tip end, and extending around the inner ring, and at least one annular recessed groove located at the tip end, and circumferentially between the inner ring and the outer ring.

Another aspect of the present disclosure is directed to a print head for use in an extrusion-based additive manufacturing system. The print head includes a flow channel having an inlet end and an outlet end, where the inlet end of the flow channel is configured to receive a consumable material. The print head also includes a heating element for heating the consumable material in the flow channel to a temperature at which the consumable material is flowable, and a nozzle. The nozzle includes an inlet end coupled to or integrally formed with the outlet end of the flow channel, a tip end offset longitudinally from the inlet end of the nozzle, and a tip pipe for extruding the flowable material received from the flow channel. The nozzle also includes an inner ring extending circumferentially around the tip pipe at the tip end of the nozzle, an outer ring extending circumferentially around the inner ring, and at least one annular recessed groove located circumferentially between the inner ring and the outer ring.

Another aspect of the present disclosure is directed to a method for printing a three-dimensional part in a layer-by-layer manner with an extrusion-based additive manufacturing system. The method includes feeding a consumable material to a print head retained by the extrusion-based additive manufacturing system, where the print head includes a flow channel and a nozzle. The nozzle includes an inner ring, an outer ring extending circumferentially around the inner ring, and at least one annular recessed groove located circumferentially between the inner ring and the outer ring. The method also includes melting the consumable material in the flow channel, and extruding the molten material from the nozzle at a first flow rate to produce a first road of the extruded material having a first road width, where the extruded material for producing the first road draws down and does not contact the outer ring. The method further includes extruding the molten material from the nozzle at a second flow rate that is greater than the first flow rate to produce a second road of the extruded material, where the second road has a second road width that is greater than the first road width of the first road.

Another aspect of the present disclosure is directed to a method for printing a three-dimensional part in a layer-by-layer manner with an extrusion-based additive manufacturing system, based on a perimeter road and an interior fill road for at least one layer of the three-dimensional part. The method includes feeding a flowable material to a print head nozzle, where the print head nozzle includes an inner ring, an outer ring extending circumferentially around the inner ring, and at least one annular recessed groove located circumferentially between the inner ring and the outer ring. The method also includes extruding a flowable material from the print head nozzle to produce the perimeter road of the layer of the three-dimensional part, where the perimeter road has a first road width and defines at least a portion of an interior region of the layer. The method further includes extruding the flowable material from the print head nozzle to produce an interior fill road of the layer of the three-dimensional part, where the interior fill road has a second road width that is greater than the first road width and fills at least a portion of the interior region of the layer.

DEFINITIONS

Unless otherwise specified, the following terms as used herein have the meanings provided below:

The terms "about" and "substantially" are used herein with respect to measurable values and ranges due to expected variations known to those skilled in the art (e.g., limitations and variabilities in measurements).

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "providing", such as for "providing a print head", when recited in the claims, is not intended to require any particular delivery or receipt of the provided item. Rather, the term "providing" is merely used to recite items that will be referred to in subsequent elements of the claim(s), for purposes of clarity and ease of readability.

BRIEF DESCRIPTION OF THE DRAWINGS

FIG. 5 is a front view of the nozzle of the present disclosure coupled to a liquefier tube of the print head.

FIG. 6 is a sectional view of the nozzle of the present disclosure, taken from section 6-6 in FIG. 5.

FIGS. 20 and 21 are photographs of a 3D part printed with a conventional wide-tip nozzle, showing surface cresting.

DETAILED DESCRIPTION

The present disclosure is directed to a print head nozzle for use in an additive manufacturing system. The nozzle of the present disclosure includes a bottom face with an inner tip ring and an outer tip ring, and at least one recessed groove between the inner and out tip rings. This allows a single nozzle to produce extruded roads having different road widths while maintaining good surface quality for printed 3D parts and/or support structures. As discussed below, this is particularly beneficial for printing narrow perimeter roads and wider interior fill roads, thereby allowing panel-based 3D parts to be printed with increased throughput, while maintaining good part quality.

Figure 1A:
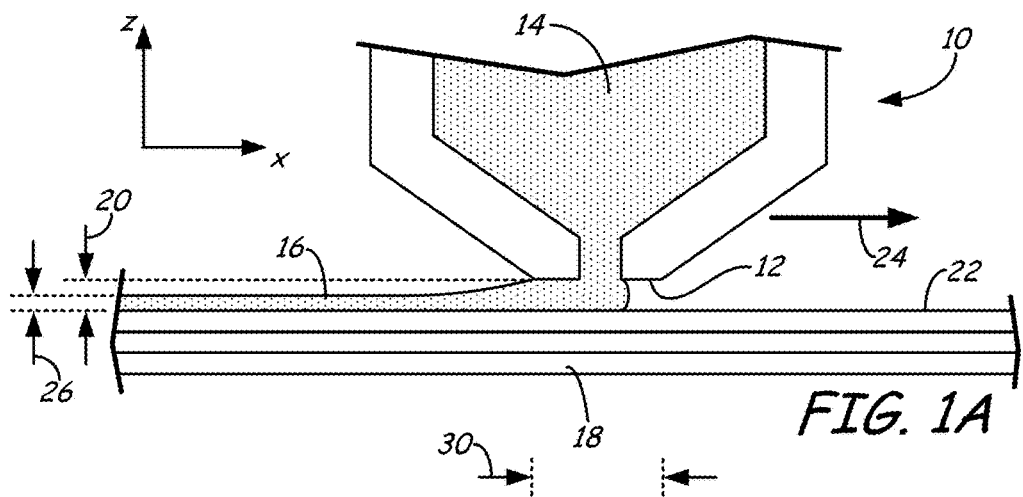
FIG. 1A is a front view of a conventional narrow-tip nozzle printing a road for a layer of a 3D part.

A conventional nozzle, such as nozzle 10 shown in FIG. 1A, typically includes a single tip ring or annulus having a planar bottom surface 12 for printing 3D parts. For example, nozzle 10 may extrude material 14 to produce a series of roads 16 in a layer-by-layer manner to print 3D part 18. The dimensions of road 16 (e.g., road height and width) are primarily dependent on the extrusion rate of material 14 and tip height 20 of bottom face 12 above surface 22 of the previous layer. The extrusion rate of material 14 itself is based on the volumetric flow rate of material 14 out of nozzle 10 and the movement speed of nozzle 10, such as in the direction of arrow 24.

During a printing operation, bottom face 12 may be maintained at tip height 20 above the previously-formed layer of 3D part 18. As discussed in co-filed U.S. patent application Ser. No. 13/587,006, entitled "Draw Control For Extrusion-Based Additive Manufacturing Systems", it has been found that the extrusion rate of material 14 and tip height 20 affect the pressure of the extruded material 14 below nozzle 10. As shown in FIG. 1A, when this pressure is low, road 16 draws down from tip height 20 to a lower road height (referred to as road height 26).

Figure 1B:
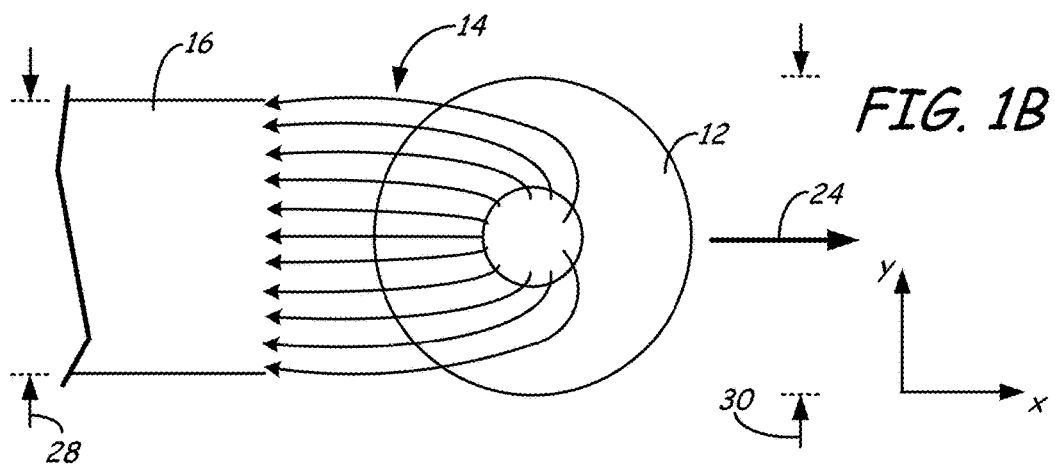
FIG. 1B is a bottom view of the conventional narrow-tip nozzle printing the stable road, illustrating a flow profile of an extruded material for the road.

This is further illustrated in FIG. 1B, which is a bottom view of bottom face 12 and road 16, and depicts a typical flow profile of material 14 from nozzle 10. The extrusion rate of material 14 can be regulated over several orders of magnitude. However, despite this versatility, nozzle 10 can only reliably produce road 16 with good road-edge quality when road width 28 is comparable to the outer diameter of bottom face 12 (referred to as outer diameter 30, shown in FIGS. 1A-1C) (e.g., within about 80% to about 100% of outer diameter 30).

Figure 1C:
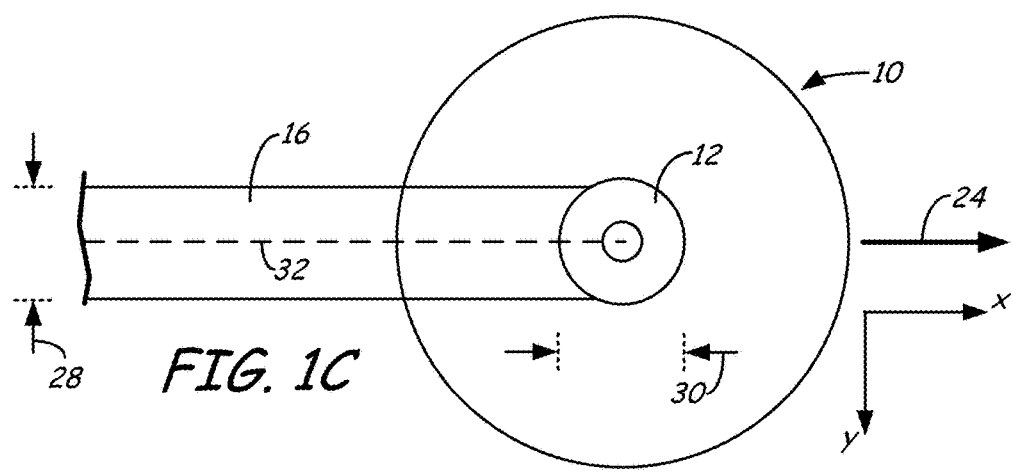
FIG. 1C is a top view of the conventional narrow-tip nozzle printing the road, illustrating non-rippling sidewalls of the road.

In general, a nozzle 10 that is capable of producing a good wide road also produces an poor narrow road, where the sidewalls of an poor road tend to ripple. For example, as shown in FIG. 1C, when nozzle 10 moves along tool path 32, the sidewalls of road 16, having a road width 28 comparable to outer diameter 30, do not ripple and remain at substantially constant distances from tool path 32.

However, if the extrusion rate of material 14 is increased in an attempt to widen road 16 to a width that is greater than outer diameter 30, the increased extrusion rate increases the pressure below nozzle 10. As discussed in co-filed U.S. patent application Ser. No. 13/587,006, entitled "Draw Control For Extrusion-Based Additive Manufacturing", this increased pressure reduces the draw on road 16, increasing road 16 to a height between road height 26 and tip height 20. More problematically, the increased pressure, can cause the extruded material 14 to curl up around the lateral edges of bottom face 12. This curl up deforms the edges of the extruded road 16, thereby reducing part quality.

Figure 2A:
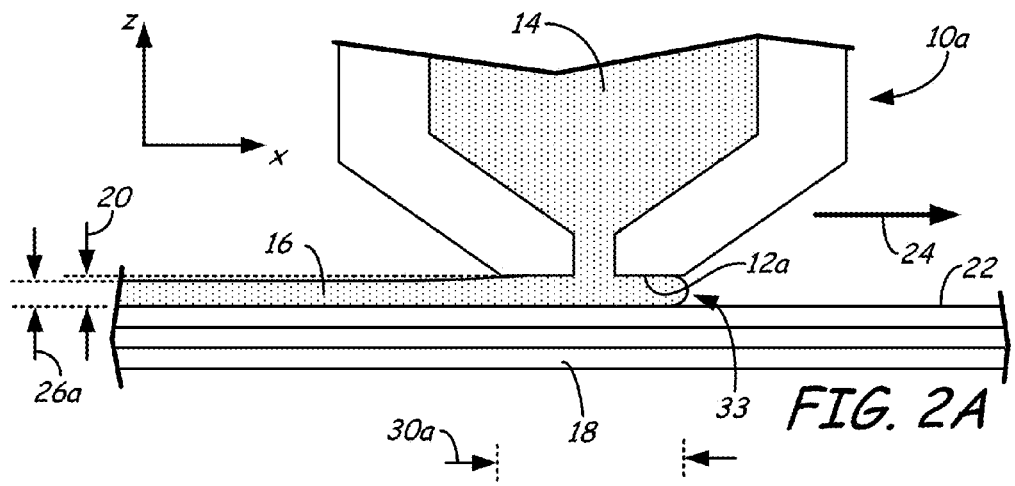
FIG. 2A is a front view of the conventional wide-tip nozzle printing a road for the layer of a 3D part.

As shown in FIG. 2A, one potential solution to prevent the curl up around the lateral edges of bottom face 12 involves using nozzle 10a having a wider planar bottom face of the tip annulus (referred to as bottom face 12a, having outer diameter 30a). However, with this design, the pressure below bottom face 12a forces a portion of the extruded material 14 upstream of road 16 in the direction that nozzle 10a moves, generating a push droplet 33 at the leading edge of road 16, below tip annulus 12a. As mentioned above, this increased pressure also reduces the draw on road 16, as illustrated by a higher road height 26a.

Figure 2B:
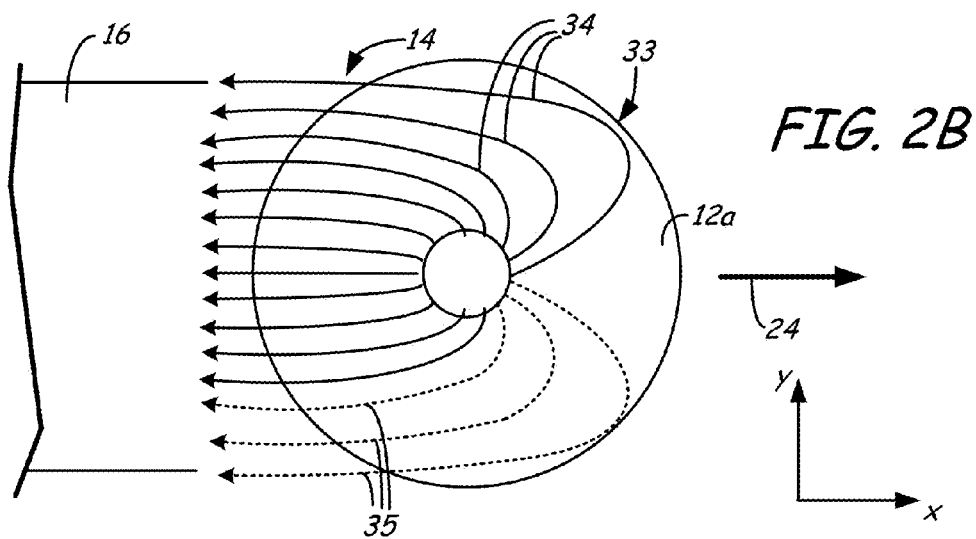
FIG. 2B is a bottom view of the conventional wide-tip nozzle printing the road, illustrating a flow profile of an extruded material for the road.
Figure 2C:
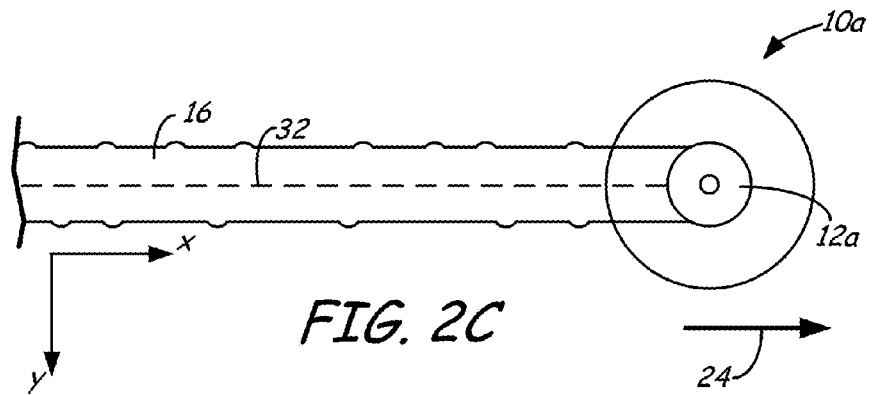
FIG. 2C is a top view of the conventional wide-tip nozzle printing the road, illustrating rippling sidewalls of the road.

As shown in FIG. 2B, if push droplet 33 comes in contact with any surface asperity from the previous layer of 3D part 18, the extruded material 14 of push droplet 33 can be forced around the left lateral edge of tip annulus 12 (as illustrated by flow arrows 34), around the right lateral edge of tip annulus 12 (as illustrated by flow arrows 35), or both, where it reaches a substantially lower flow resistance. This results in visually-apparent bumpiness in the extruded road 16, as illustrated in FIG. 2C by the ripples in the sidewalls of road 16 relative to tool path 32. As this continues over successive layers of 3D part 18, the oscillations of the unstable roads 16 accumulate to form crests at the surface of 3D part 18. These crests are readily visible to the naked eye and reduce the surface qualities of 3D part 18, as illustrated in FIGS. 20 and 21 below.

Hence, a conventional nozzle, such as nozzle 10, can only produce stable roads within a limited range of road widths. If a different road width is otherwise desired, this would require installation of a separate nozzle designed to accommodate this different road width, or the use of multiple print heads with different-sized tips. As can be appreciated, this can result in delays during printing operations and increased equipment costs.

The nozzle of the present disclosure, however, is capable of producing roads having good edge quality over multiple road widths from a single nozzle. For example, as discussed below, the nozzle of the present disclosure can produce narrow perimeter roads (e.g., 0.5-1.0 millimeter roads) to provide a good surface resolution, and produce wide interior roads (e.g., 2.0-2.5 millimeter roads) to fill the interior region between the perimeter roads. This can substantially reduce the time required to print 3D parts while maintaining good surface quality (e.g., little or no crests or ripples). This is in addition to increased z-axis lamination strengths (due to the wider fill road 1548), as well as reduced porosity and sealing properties. This opens up a wide variety of 3D-part geometries that can be produced with good surface quality and increased throughput.

Figure 3:
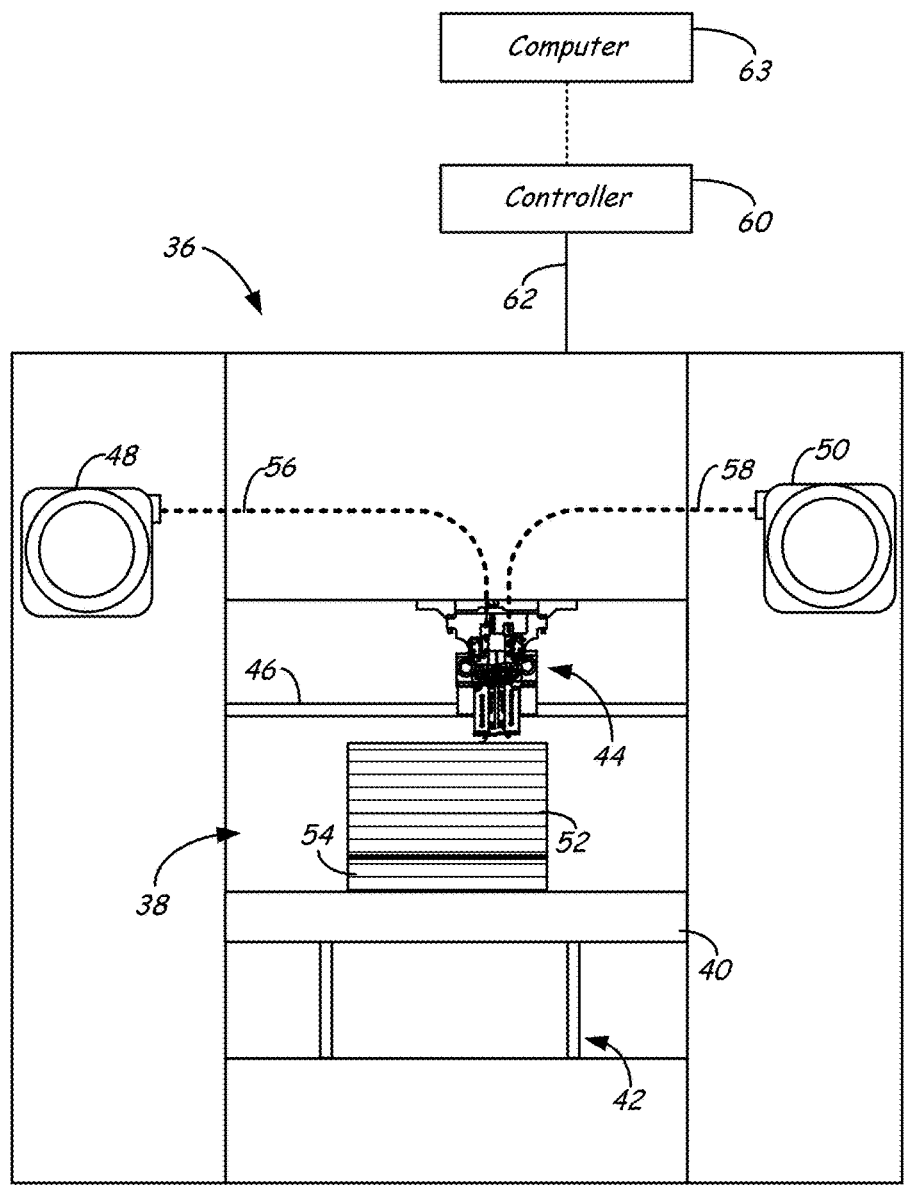
FIG. 3 is a front view of an extrusion-based additive manufacturing system that includes a nozzle of the present disclosure.

The nozzle can be incorporated into any suitable extrusion-based additive manufacturing system that prints or otherwise builds 3D parts and/or support structures using a layer-based, additive manufacturing technique, such as system 36 shown in FIG. 3. Suitable additive manufacturing systems for system 36 include extrusion-based additive manufacturing systems developed by Stratasys, Inc., Eden Prairie, Minn. under the trademarks "FDM" and "FUSED DEPOSITION MODELING".

In the shown embodiment, system 36 includes chamber 38, platen 40, platen gantry 42, print head 44, head gantry 46, and consumable assemblies 48 and 50, where print head 44 may include one or more nozzles of the present disclosure. Chamber 38 is an enclosed environment that contains platen 40 for printing 3D parts (e.g., 3D part 52) and support structures (e.g., support structure 54). Chamber 38 may be heated (e.g., with circulating heated air) to reduce the rate at which the part and support materials solidify after being extruded and deposited (e.g., to reduce distortions and curling). In alternative embodiments, chamber 38 may be omitted and/or replaced with different types of build environments. For example, 3D part 52 and support structure 54 may be built in a build environment that is open to ambient conditions or may be enclosed with alternative structures (e.g., flexible curtains).

Platen 40 is a platform on which 3D part 52 and support structure 54 are printed in a layer-by-layer manner. In some embodiments, platen 40 may also include a flexible polymeric film or liner on which 3D part 52 and support structure 54 are printed. In the shown example, print head 44 is a dual-tip extrusion head configured to receive consumable filaments from consumable assemblies 48 and 50 (e.g., via guide tubes 56 and 58) for printing 3D part 52 and support structure 54 on platen 40.

Platen 40 is supported by platen gantry 42, which is a gantry assembly configured to move platen 40 along (or substantially along) a vertical z-axis Correspondingly, print head 44 is supported by head gantry 46, which is a gantry assembly configured to move print head 44 in (or substantially in) a horizontal x-y plane above chamber 38.

In an alternative embodiment, platen 40 may be configured to move in the horizontal x-y plane within chamber 38, and print head 44 may be configured to move along the z-axis. Other similar arrangements may also be used such that one or both of platen 40 and print head 44 are moveable relative to each other. Platen 40 and print head 44 may also be oriented along different axes. For example, platen 40 may be oriented vertically and print head 44 may print 3D part 52 and support structure 54 along the x-axis or the y-axis.

Suitable devices for consumable assemblies 48 and 50 include those disclosed in Swanson et al., U.S. Pat. No. 6,923,634; Comb et al., U.S. Pat. No. 7,122,246; Taatjes et al, U.S. Pat. Nos. 7,938,351 and 7,938,356; Swanson, U.S. Patent Application Publication No. 2010/0283172; and Mannella et al., U.S. patent application Ser. Nos. 13/334,910 and 13/334,921. Examples of suitable average diameters for the consumable filaments range from about 1.02 millimeters (about 0.040 inches) to about 3.0 millimeters (about 0.120 inches).

System 36 also includes controller 60, which is one or more control circuits configured to monitor and operate the components of system 36. For example, one or more of the control functions performed by controller 60 can be implemented in hardware, software, firmware, and the like, or a combination thereof. Controller 60 may communicate over communication line 62 with chamber 38 (e.g., with a heating unit for chamber 38), print head 44, and various sensors, calibration devices, display devices, and/or user input devices.

In some embodiments, controller 60 may also communicate with one or more of platen 40, platen gantry 42, head gantry 46, and any other suitable component of system 36. While illustrated as a single signal line, communication line 62 may include one or more electrical, optical, and/or wireless signal lines, allowing controller 60 to communicate with various components of system 36. Furthermore, while illustrated outside of system 36, controller 60 and communication line 62 are desirably internal components to system 36.

System 36 and/or controller 60 may also communicate with computer 63, which is one or more computer-based systems that communicates with system 36 and/or controller 60, and may be separate from system 36, or alternatively may be an internal component of system 36. Computer 63 includes computer-based hardware, such as data storage devices, processors, memory modules and the like for generating and storing tool path and related printing instructions. Computer 63 may transmit these instructions to system 36 (e.g., to controller 60) to perform printing operations.

Figure 4:
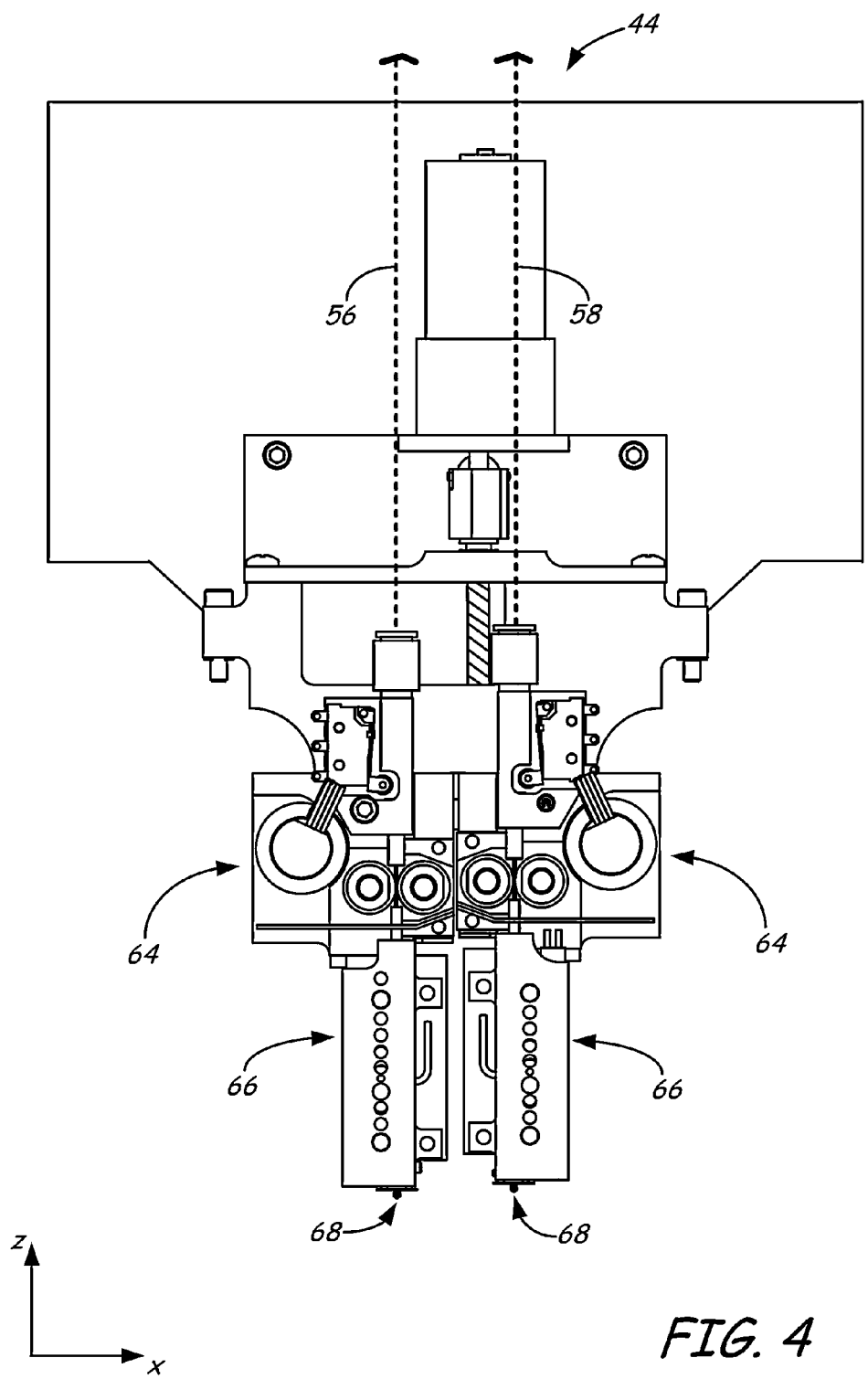
FIG. 4 is a front view of a print head of the extrusion-based additive manufacturing system that includes the nozzle of the present disclosure.

FIG. 4 illustrates a suitable device for print head 44, as described in Leavitt, U.S. Pat. No. 7,625,200, which has been modified to include the nozzle of the present disclosure. Additional examples of suitable devices for print head 44, and the connections between print head 44 and head gantry 46 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Batchelder et al., U.S. Pat. No. 7,896,209; and Comb et al., U.S. Pat. No. 8,153,182.

In additional embodiments, in which print head 44 is an interchangeable, single-nozzle print head, examples of suitable devices for each print head 44, and the connections between print head 44 and head gantry 46 include those disclosed in Swanson et al., U.S. Patent Application Publication No. 2012/0164256.

The shown dual-tip embodiment for print head 44 includes two drive mechanism 64, two liquefier assemblies 66, and two nozzles 68 of the present disclosure. During operation, controller 60 may direct drive mechanisms 64 to selectively draw successive segments of the part and support material filaments from consumable assemblies 48 and 50 (via guide tubes 56 and 58), and feed the filaments to liquefier assemblies 66. Liquefier assemblies 66 thermally melt the successive segments of the received filaments such that they become molten flowable materials. The molten flowable materials are then extruded and deposited from nozzles 68 onto platen 40 for printing 3D part 52 (from the part material) and support structure 54 (from the support material).

Suitable materials and filaments for use with print head 44 include those disclosed and listed in Crump et al., U.S. Pat. No. 5,503,785; Lombardi et al., U.S. Pat. Nos. 6,070,107 and 6,228,923; Priedeman et al., U.S. Pat. No. 6,790,403; Comb et al., U.S. Pat. No. 7,122,246; Batchelder, U.S. Patent Application Publication Nos. 2009/0263582, 2011/0076496, 2011/0076495, 2011/0117268, 2011/0121476, and 2011/0233804; and Hopkins et al., U.S. Patent Application Publication No. 2010/0096072. Examples of suitable average diameters for the filaments range from about 1.02 millimeters (about 0.040 inches) to about 3.0 millimeters (about 0.120 inches).

FIG. 5 illustrates nozzle 68 secured to liquefier tube 70, where liquefier tube 70 is a sub-component of liquefier assembly 66. Liquefier tube 70 is an example of a suitable device having a flow channel for delivering flowable part or support materials to nozzle 68, and includes inlet end 72 and outlet end 74 offset along longitudinal axis 76. In alternative embodiments, nozzle 68 may be used with a variety of different flow channels (e.g., non-tube-based liquefiers). In further alternative embodiments, liquefier assembly 232 may have a non-cylindrical geometry (e.g., a ribbon liquefier for use with a ribbon filament), as disclosed in Batchelder et al., U.S. Patent Application Publication Nos. 2011/0076496 and 2011/0074065.

Nozzle 68 is a rigid structure fabricated from one or more metallic materials (e.g., stainless steel), and is secured to, or is otherwise engageable with outlet end 74 of liquefier tube 70. In some embodiments, nozzle 68 may be integrally formed with liquefier tube 70 as a sub-component of liquefier assembly 66, and may also include a tip shield (not shown).

As shown in FIG. 6, nozzle 68 includes nozzle body 78 having inlet end 80 and tip end 82 offset along longitudinal axis 76. Nozzle body 78 may be configured to couple with a variety of external components (e.g., a tip shield, not shown), and defines axial channel 84 and tip pipe 86. Axial channel 84 extends longitudinally between inlet end 80 and tip pipe 86, and is a central conduit for receiving the flowable part or support materials from liquefier tube 70. Tip pipe 86 is a reduced diameter region located between axial channel 84 and tip end 82, and can have any suitable dimensions. For example, while illustrated with a length to diameter ratio greater than three, examples of suitable length-to-diameter ratios for tip pipe 86 range from about 1:2 to greater than 5:1, such as from 1:2 to 2:1, or greater than 4:1. Tip pipe 86 functions as a flow resistor, making the flow characteristics of liquefier assembly 66 or other flow channel more time-constrained and repeatable.

Figure 7A:
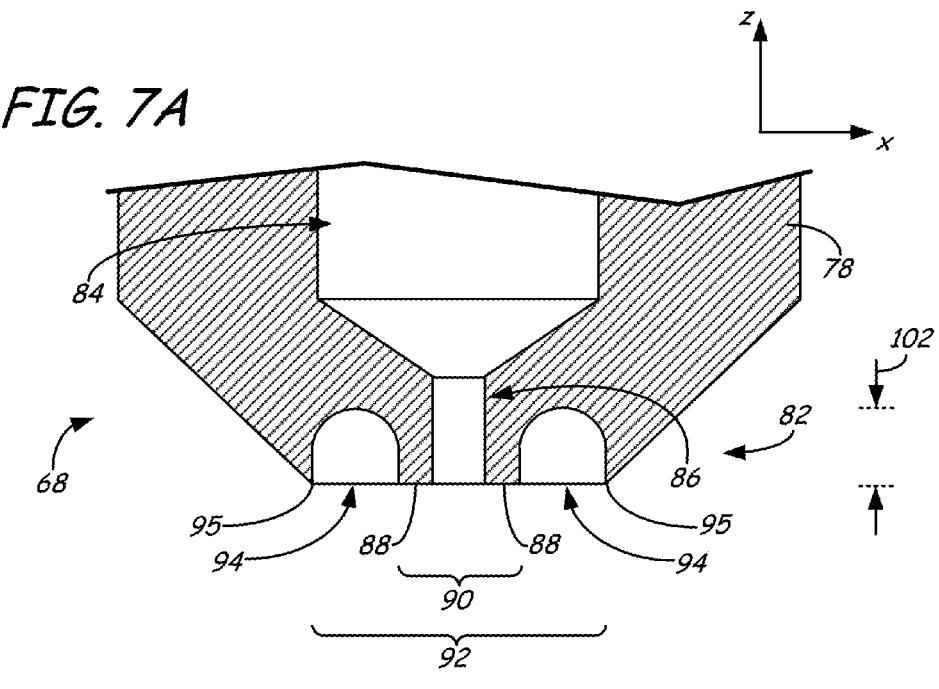
FIG. 7A is an expanded sectional view of a bottom portion of the nozzle of the present disclosure.
Figure 7B:
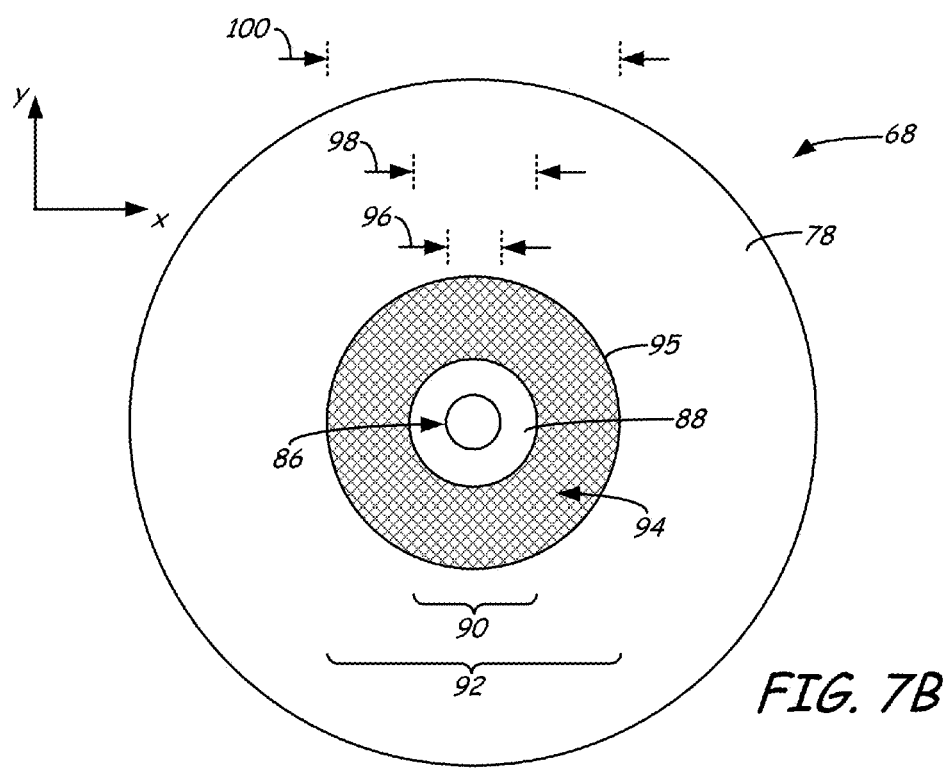
FIG. 7B is a bottom view of the nozzle of the present disclosure, where a recessed groove of the nozzle is depicted with cross-hatching for ease of visibility.

At tip end 82, nozzle 68 also includes inner ring or annulus 90, outer ring or annulus 92, and an annular recessed groove 94 located circumferentially between inner ring 90 and outer ring 92. This is further illustrated in FIGS. 7A and 7B, where recessed groove 94 is depicted with cross-hatching in FIG. 7B for ease of visibility.

Inner ring 90 extends circumferentially between tip pipe 86 and recessed groove 94, and has bottom planar face 88. As discussed below, inner ring 90 is suitable for printing roads having good road edge quality within a first range of road widths. Outer ring 92 extends circumferentially around inner ring 90 and recessed groove 94, and has a knife-edge or substantially knife-edge face 95. In comparison to inner ring 90, outer ring 92 is suitable for printing roads having good road edge quality within a second range of road widths that are greater than the first range of road widths. As can be appreciated, this arrangement allows a single nozzle 68 to print both narrow and wide roads while maintaining good surface quality.

Recessed groove 94 is an annular groove milled or otherwise formed in tip end 82 to separate and define inner ring 90 and outer ring 92. As discussed below, this separation of inner ring 90 and outer ring 92 allows a flowable material to be guided by inner ring 90 alone to produce a narrow road, or by a combination of inner ring 90 and outer ring 92 to produce a wider road.

The dimensions of inner ring 90, outer ring 92, and recessed groove 94 may vary depending on the desired extrusion profiles. Examples of suitable inner diameters for inner ring 90 (referred to as inner diameter 96, corresponding to the diameter of tip pipe 86 at tip end 82) range from about 130 micrometers (about 0.005 inches) to about 640 micrometers (about 0.025 inches), with particularly suitable inner diameters ranging from about 250 micrometers (about 0.01 inches) to about 500 micrometers (about 0.02 inches). Examples of suitable outer diameters for inner ring 90 (referred to as outer diameter 98) range from about 500 micrometers (about 0.02 inches) to about 1,300 micrometers (about 0.05 inches), with particularly suitable outer diameters ranging from about 640 micrometers (about 0.025 inches) to about 900 micrometers (about 0.035 inches), where outer diameter 98 is greater than inner diameter 96.

As mentioned above, in the shown embodiment, outer ring 92 has a knife-edge face 95 at tip end 82. This provides a single knife-edge diameter. Accordingly, in this embodiment, examples of suitable knife-edge diameters for outer ring 92 (referred to as knife-edge diameter 100) range from about 1,500 micrometers (about 0.06 inches) to about 2,500 micrometers (about 0.10 inches), with particularly suitable diameters ranging from about 1,800 micrometers (about 0.07 inches) to about 2,300 micrometers (about 0.09 inches).

Suitable inner and outer diameters for recessed groove 94 correspond respectively to outer diameter 98 (of inner ring 90) and knife-edge diameter 100 (of outer ring 92). Recessed groove 94 is desirably wide enough in a radial direction between inner ring 90 and outer ring 92 to prevent tip end 82 from functioning as a fully-planar surface. Accordingly, recessed groove 94 is desirably at least 760 micrometers (about 0.03 inches) wide, more desirably at least 1,000 micrometers (about 0.04 inches) wide, and even more desirably at least 1,100 micrometers (about 0.045 inches) wide (in a radial width between inner ring 90 and outer ring 92). Examples of suitable average depths from bottom face 88 for recessed groove 94 (referred to as depth 102, shown in FIG. 7A) include depths of at least about 250 micrometers (about 0.01 inches), and more desirably range from about 500 micrometers (about 0.02 inches) to about 1,300 micrometers (about 0.05 inches). As can be seen, recessed groove 94 is desirably at least a wide as deep. Additionally, while not wishing to be bound by theory, it is believed that if recessed groove 94 is too shallow, portions of the flowable material may clog recessed groove 94, effectively sealing it off. This can result in a generally planar surface for tip end 82, which is undesirable as discussed above for nozzle 10a (shown in FIGS. 2A-2C).

Nozzle 68 is beneficial for a variety of additive manufacturing uses. For example, as further discussed below, nozzle 68 can print narrow perimeter roads of a layer using inner ring 90, and then print a wider interior road using both inner ring 90 and outer ring 92 to fill the interior region between the perimeter roads. This eliminates the need for a raster fill of the interior region, which can be a time-consuming process.

Figure 8A:
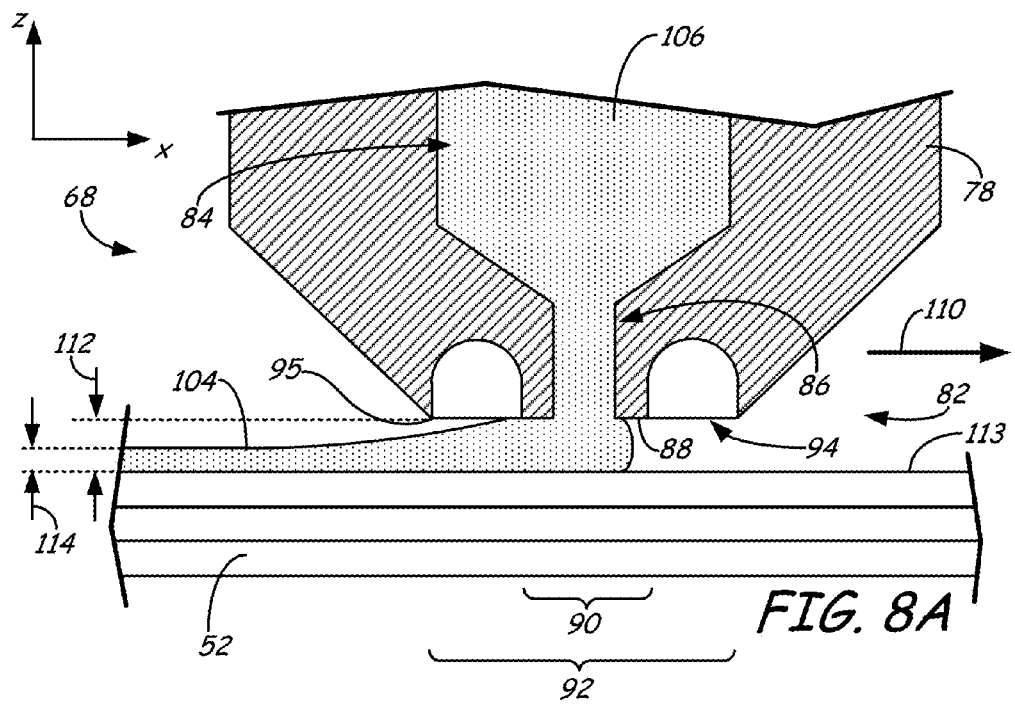
FIG. 8A is an expanded sectional view of the bottom portion of the nozzle of the present disclosure, where the nozzle is printing a narrow road of a 3D part or support structure.
Figure 8B:
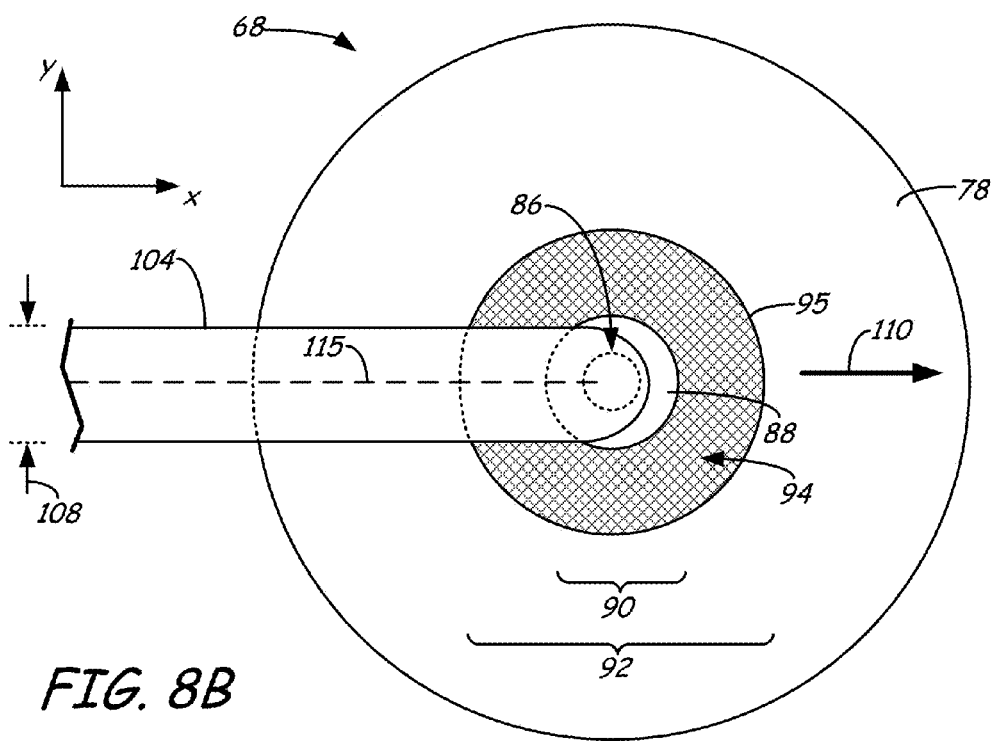
FIG. 8B is a bottom view of the nozzle of the present disclosure, where the recessed groove of the nozzle is depicted with cross-hatching for ease of visibility, and where the nozzle is printing the narrow road.

FIGS. 8A and 8B illustrate nozzle 68 printing road 104 of 3D part 52 (or support structure 54) from a flowable part (or support) material 106. In this example, road 104 has a relatively narrow road width (referred to as road width 108, shown in FIG. 8B), such as for perimeter roads of a layer of 3D part 52.

As discussed in co-filed U.S. patent application Ser. No. 13/587,006, entitled "Draw Control For Extrusion-Based Additive Manufacturing Systems", it has been found that the extrusion rate of flowable material 106 and the height of nozzle 68 affect the pressure of the extruded flowable material 106 below nozzle 68, which correspondingly affects the dimensions of road 104 (e.g., road height and width). The extrusion rate of flowable material 106 itself is based on the volumetric flow rate of flowable material 106 out of nozzle 68 and the movement speed or velocity of nozzle 68, such as in the direction of arrow 110.

During the printing operation, bottom face 88 may be maintained at tip height 112 above surface 113 of the previous layer of 3D part 52, which draws road 104 down from tip height 112 to a lower height, referred to as road height 114. As illustrated in FIG. 8A, this draw prevents outer ring 92 from contacting and interfering with the extruded flowable material 106. As such, the extruded flowable material 106 is guided by inner ring 90 (and not by outer ring 92) to produce road 104 having good road edge quality, with road width 108 comparable to outer diameter 98 of inner ring 90.

This is illustrated in FIG. 8B, where the sidewalls of road 104 do not ripple and remain at substantially constant distances from tool path 115. Thus, recessed groove 94 prevents tip end 82 from functioning as a fully-planar bottom surface. A fully-planar bottom surface between the locations of inner ring 90 and outer ring 92 would otherwise contact and interfere with the extruded flowable material 106 when extruding a narrow road (e.g., road 104), which can result in ripples and cresting, as discussed above for nozzle 10a (shown in FIGS. 2A-2C).

Figure 9A:
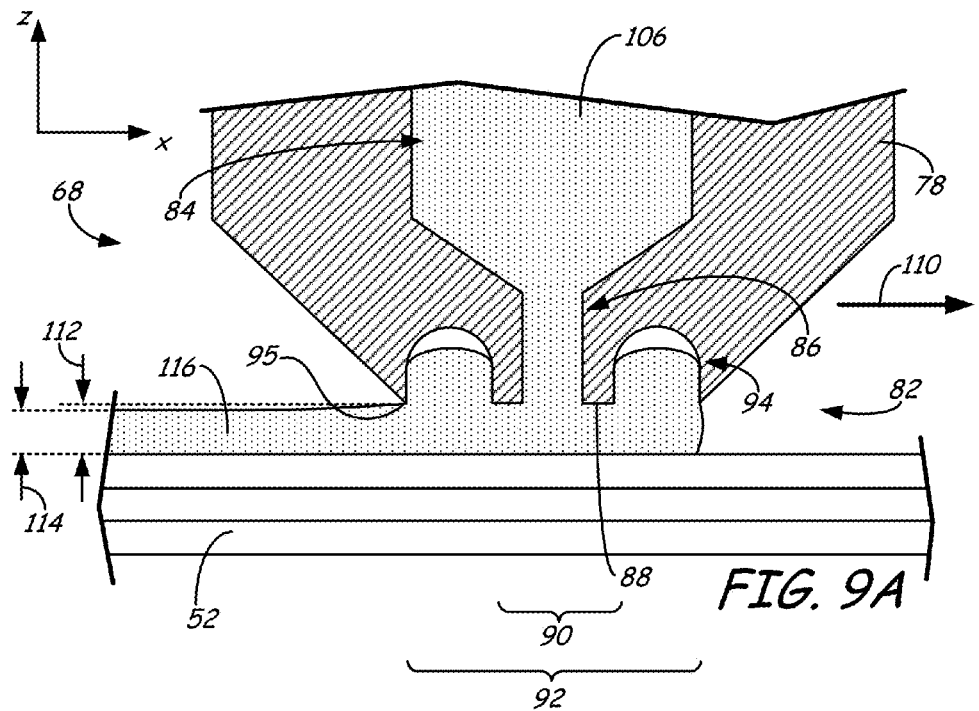
FIG. 9A is an expanded sectional view of the bottom portion of the nozzle of the present disclosure, where the nozzle is printing a wider road of the 3D part or support structure.
Figure 9B:
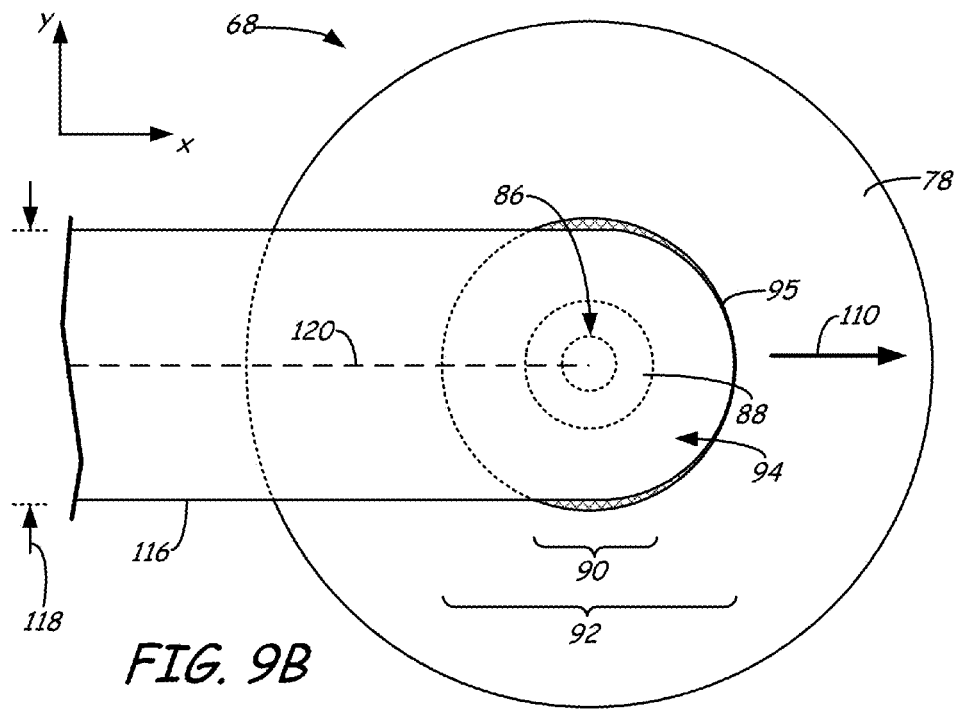
FIG. 9B is a bottom view of the nozzle of the present disclosure, where the recessed groove of the nozzle is depicted with cross-hatching for ease of visibility, and where the nozzle is printing the wider road.

FIGS. 9A and 9B illustrate nozzle 68 printing road 116, where road 116 is wider than road 104 (having road width 118, shown in FIG. 8B). Hence, road 116 is suitable for use as an interior fill road of a layer of 3D part 52, for example. The dimensions of road 116 (e.g., road height and width) are also primarily based on the extrusion rate of flowable material 106 and tip height 112. Road 116 may be produced with road width 118 by increasing the extrusion rate of flowable material 106, such as by increasing the volumetric flow rate of flowable material 106 from nozzle 68, by slowing down the movement of nozzle 68 in the direction of arrow 110, or by a combination thereof.

Increasing the extrusion rate causes flowable material 106 to flow laterally around inner ring 90 and into recessed groove 94 to outer ring 92. As discussed above and in co-filed U.S. patent application Ser. No. 13/587,006, entitled "Draw Control For Extrusion-Based Additive Manufacturing", this also reduces the draw on road 116, as illustrated by a higher road height 114.

However, in this situation, outer ring 92 functions as a larger-diameter tip to guide the extruded flowable material 106. As such, the extruded flowable material 106 is guided by inner ring 90 and by outer ring 92 to produce a road 116 having good road edge quality, with road width 118 comparable to diameter 100 of outer ring 92. This is illustrated in FIG. 9B, where the sidewalls of road 116 do not ripple and remain at substantially constant distances from tool path 120.

Figure 10:
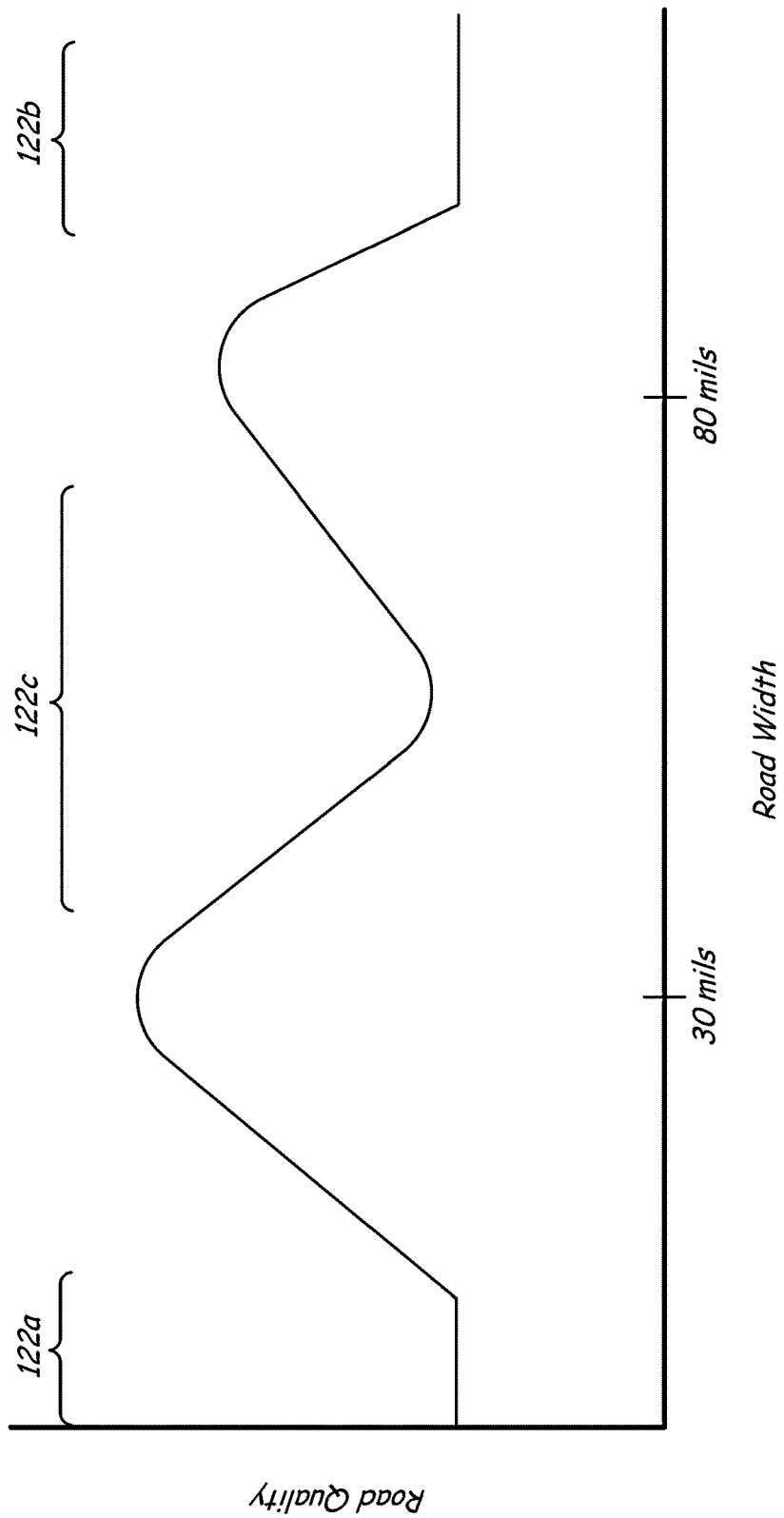
FIG. 10 is a graphical illustration of road stability versus road width for roads produced by the nozzle of the present disclosure.

As can be appreciated, the use of inner ring 90 and outer ring 92, separated by recessed groove 94, allows nozzle 68 to produce smooth, quality roads comparable to outer diameter 98 of inner ring 90, and to produce smooth, quality roads comparable to diameter 100 of outer tip 94. For example, as illustrated in FIG. 10, if outer diameter 98 of inner tip diameter 90 is about 760 micrometers (about 0.03 inches) and diameter 100 of outer tip 94 is about 2,000 micrometers (about 0.08 inches), nozzle 68 may produce a stable road 104 for road widths 108 ranging from about 250 micrometers (about 0.01 inches) to about 1,000 micrometers (about 0.04 inches), and a stable road 116 for road widths 118 ranging from about 2,000 micrometers (about 0.08 inches) to about 2,500 micrometers (about 0.10 inches).

If the extrusion rate of flowable material 106 is set to produce an extruded road having a road width that is less than about 250 micrometers (about 0.01 inches) (referred to as road width range 122a), the resulting road may exhibit streaks and gaps in the extruded material, which is undesirable. Alternatively, if the extrusion rate of flowable material 106 is set to produce an extruded road having a road width that is greater than about 2,500 micrometers (about 0.10 inches) (referred to as road width range 122b), the resulting road may exhibit the curl-up effect, where the flowable material 106 curls up around the lateral edge of outer ring 92.

Furthermore, if the extrusion rate of flowable material 106 is set to produce an extruded road having a road width that is in-between the dimensions of inner ring 90 and outer ring 92 (referred to as road width range 122c), the resulting road is less stable compared to roads 104 and 116 and may exhibit low levels of cresting. However, the stability of the resulting road is still greater than if a conventional nozzle was used.

In general, the narrower roads 104 produced by inner ring 90 are more stable than the wider roads 116 produced by outer ring 92. However, in situations where roads 104 are perimeter roads of a layer of 3D part 52 and road 116 is an interior fill road of the layer, the stability of road 116 is less of a concern since roads 104 define the surface quality of the layer. As such, so long as the perimeter roads 104 have road widths comparable to outer diameter 98 of inner ring 90 (e.g., from about 30% of outer diameter 98 to about 125% of outer diameter 98), the interior fill roads can have road widths that range from greater than about outer diameter 98 of inner ring 90 to about 120% of diameter 100 while maintaining good surface quality for printed 3D parts and/or support structures. This allows thin-wall layer regions that have different wall thicknesses to be printed from the same nozzle 68.

Figure 11:
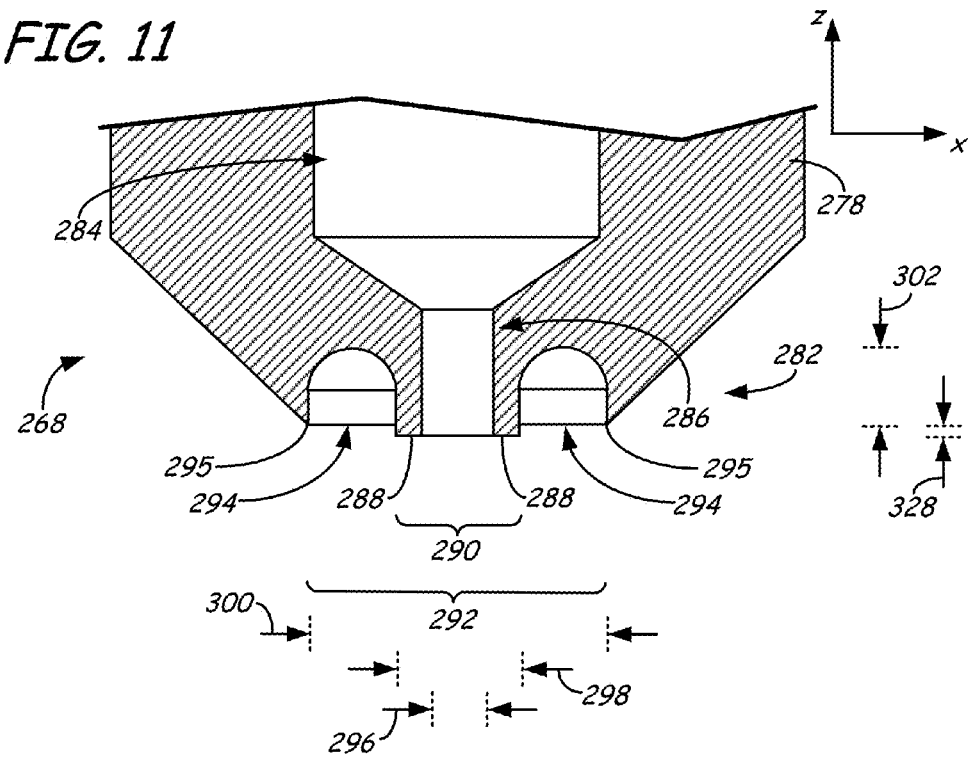
FIG. 11 is an expanded sectional view of a bottom portion of a first alternative nozzle of the present disclosure, which includes an inner ring that is proud of its outer ring.

FIGS. 11-16 illustrate alternative nozzles of the present disclosure for use with system 36, where corresponding reference numbers are respectively increased by "200", "400", "600", "800", "1000", and "1200" from those of nozzle 68. As shown in FIG. 11, nozzle 268 is similar to nozzle 68, except that inner ring 290 is proud of outer ring 292 (i.e., extends further downward) by offset distance 328.

Examples of suitable distances for offset distance 328 range from about 25 micrometers (about 0.001 inches) to about 250 micrometers (about 0.01 inches), with particularly suitable distances ranging from about 50 micrometers (about 0.002 inches) to about 130 micrometers (about 0.005 inches). In this embodiment, depth 302 of recessed groove 294 is based on the height of the upper-most tip annulus, which, in this example, is the height of outer ring 292.

Figure 12:
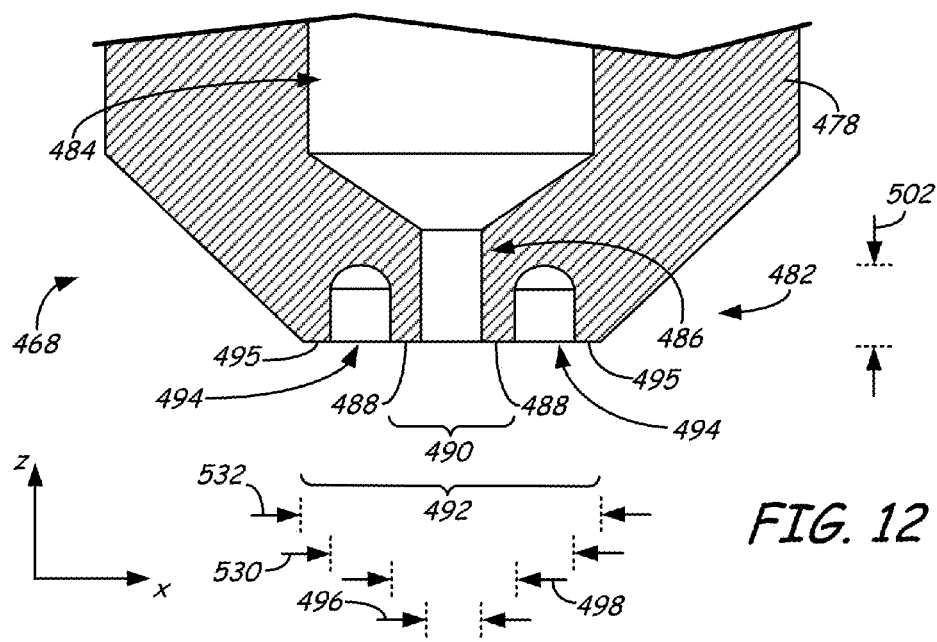
FIG. 12 is an expanded sectional view of a bottom portion of a second alternative nozzle of the present disclosure, which includes a planar outer ring.

As shown in FIG. 12, nozzle 468 is also similar to nozzle 68, except that outer ring 492 has a planar bottom face 495 rather than a knife-edge face. In this embodiment, outer ring 492 has an inner diameter 530 and an outer diameter 532, where outer diameter 532 corresponds to diameter 100 of nozzle 68. Accordingly, examples of suitable diameters for outer diameter 532 include those discussed above for diameter 100 of nozzle 68.

Examples of suitable diameters for inner diameter 530 from about 1,300 micrometers (about 0.05 inches) to about 2,300 micrometers (about 0.09 inches), with particularly suitable diameters ranging from about 1,500 micrometers (about 0.06 inches) to about 2,000 micrometers (about 0.08 inches), where inner diameter 530 of outer ring 492 is greater than outer diameter 498 of inner ring 490, and is less than outer diameter 532. Suitable inner and outer diameters for recessed groove 494 correspond respectively to outer diameter 498 (of inner ring 490) and inner diameter 530 (of outer ring 492). The planar bottom surface of outer ring 494 may also be combined with the extended inner ring embodiment discussed above for nozzle 268 (shown in FIG. 11).

Figure 13:
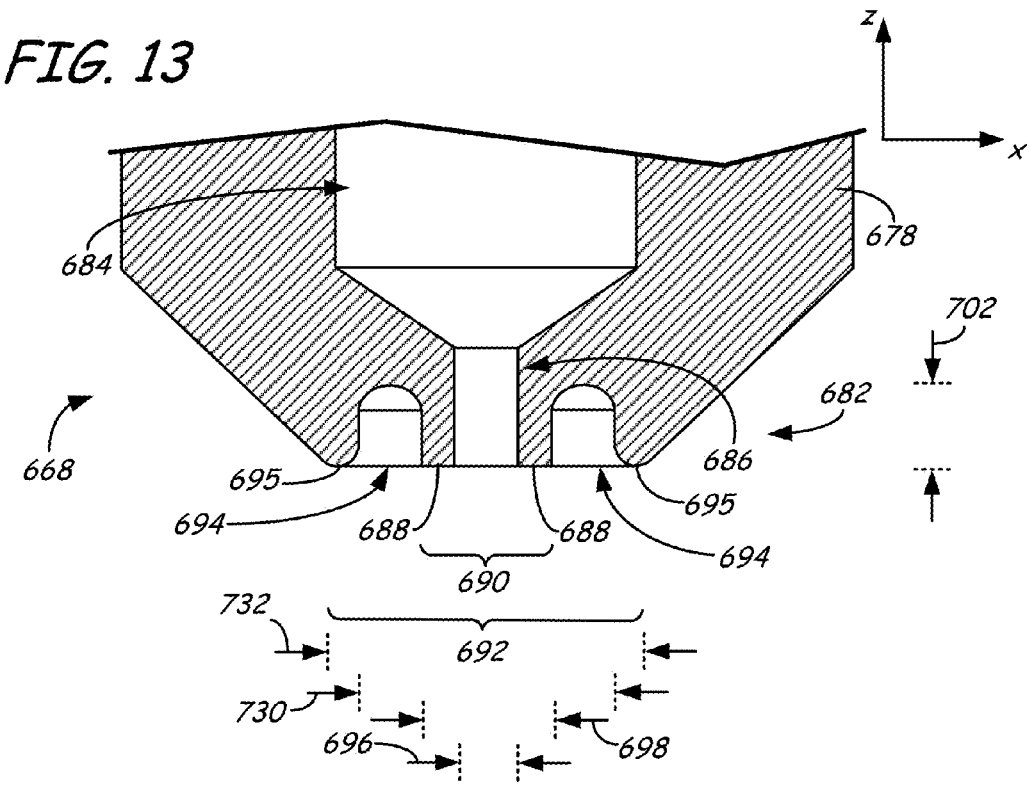
FIG. 13 is an expanded sectional view of a bottom portion of a third alternative nozzle of the present disclosure, which includes a planar outer ring.

As shown in FIG. 13, nozzle 668 is similar to nozzles 68 and 468, except that outer ring 692 has a rounded or toroidal bottom face 695 rather than a knife-edge face or planar bottom face. In this embodiment, outer ring 692 has an inner diameter 730 and an outer diameter 732, which correspond to inner diameter 530 and outer diameter 532 of nozzle 468. Accordingly, examples of suitable diameters for inner diameter 730 and outer diameter 732 include those discussed above for inner diameter 530 and outer diameter 532 of nozzle 468. The rounded or toroidal bottom face 495 of outer ring 694 may also be combined with the extended inner ring embodiment discussed above for nozzle 268 (shown in FIG. 11).

Figure 14:
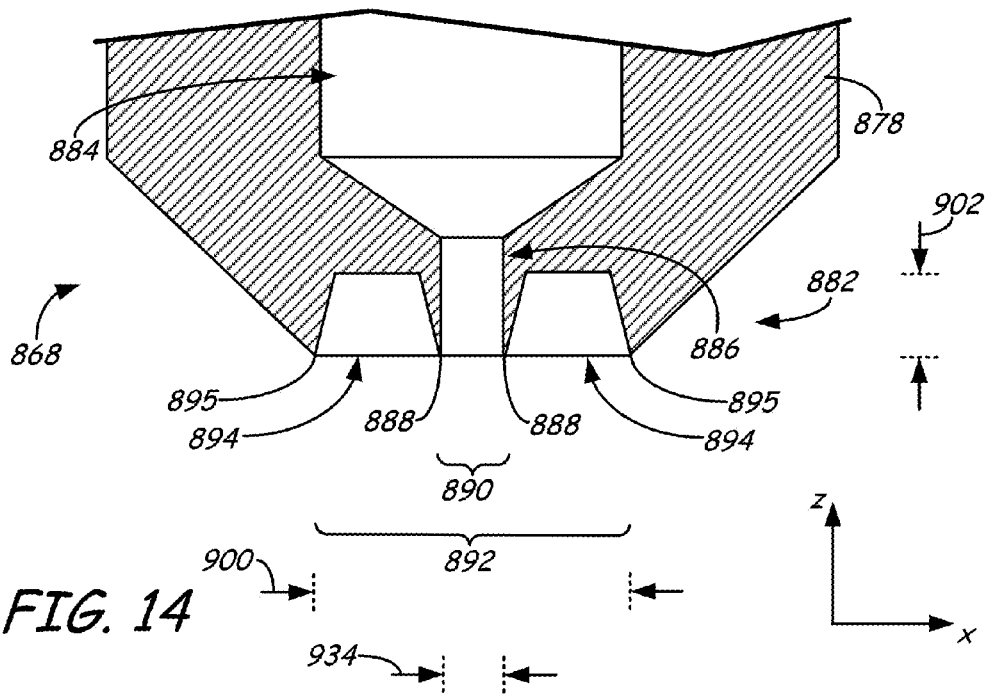
FIG. 14 is an expanded sectional view of a bottom portion of a fourth alternative nozzle of the present disclosure, which includes a knife-edge inner ring.

As shown in FIG. 14, nozzle 868 is also similar to nozzle 68, except that inner ring 890 has a knife-edge or substantially knife-edge face 888 rather than a planar bottom face. In this embodiment, inner ring 890 has a diameter 934 corresponding to inner diameter 96 of nozzle 68. Accordingly, examples of suitable diameters for diameter 934 include those discussed above for inner diameter 96 of nozzle 68. The knife edge face 888 of inner ring 890 may also be combined with the extended inner ring embodiment discussed above for extrusion nozzle 268 (shown in FIG. 11), with the planar bottom face 495 of outer ring 492 (of nozzle 468, shown in FIG. 12), and/or with the rounded or toroidal bottom face 695 of outer ring 694 (of nozzle 668, shown in FIG. 13).

Figure 15:
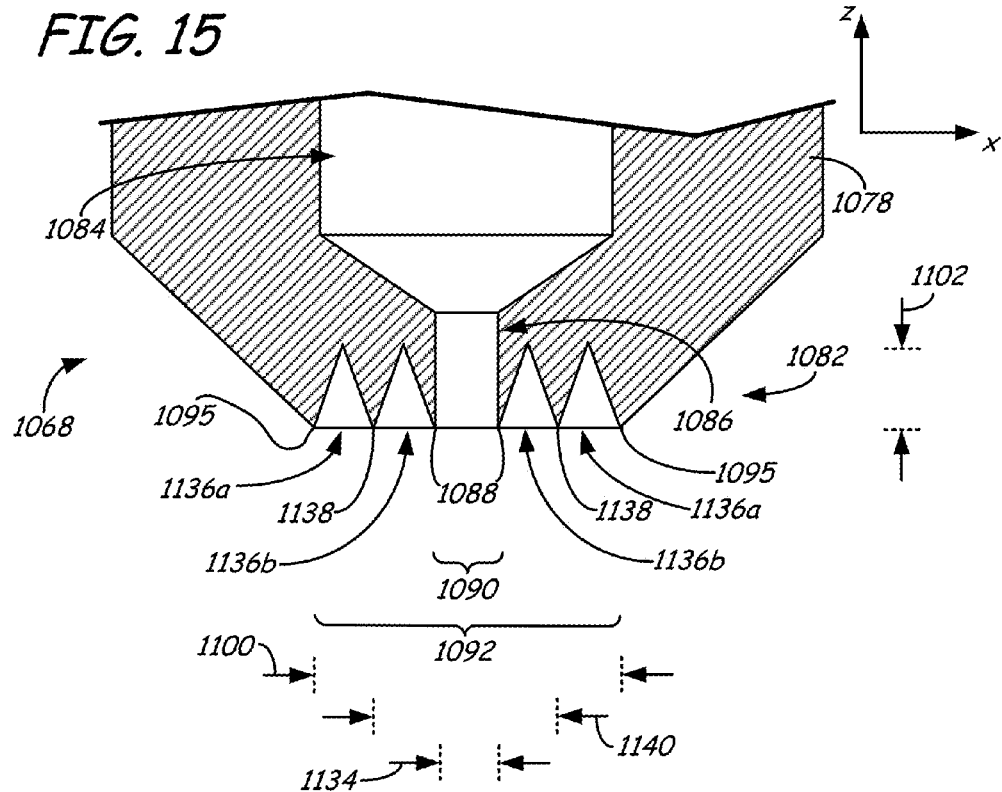
FIG. 15 is an expanded sectional view of a bottom portion of a fifth alternative nozzle of the present disclosure, which includes three rings separated by two recessed grooves.

As shown in FIG. 15, nozzle 1068 is similar to nozzle 868, except that recessed groove 894 is replaced with multiple recessed grooves 1136a and 1136b located circumferentially between inner ring 1090 and outer ring 1092. Recessed grooves 1136a and 1136b define intermediate ring 1138 located circumferentially there-between, which has a diameter 1140. In the shown embodiment, intermediate ring 1138 has a knife edge or substantially-knife face. In alternative embodiments, intermediate ring 1138 may have a planar bottom face or a rounded bottom face.

Suitable dimensions for recessed grooves 1136a and 1136b and intermediate ring 1138 (e.g., diameter 1140) may vary depending on the dimensions of inner ring 1090 and outer ring 1092. For example, middle ring 1138 may be located at a midpoint diameter between inner ring 1090 and outer ring 1092. Recessed grooves 1136a and 1136b are desirably wide enough to prevent tip end 1082 from functioning as a fully-planar bottom face. In particular, when producing a narrow road from inner ring 1090, intermediate ring 1138 and outer ring 1092 desirably do not contact or interfere with the extruded flowable material.

Intermediate ring 1138 assists inner ring 1090 and outer ring 1092 in producing stable roads for road widths that are between the dimensions of inner ring 1090 and outer ring 1092. This further increases the stability of the roads that may be produced by nozzle 1068. While illustrated with a single intermediate ring 1138 and a pair of recessed grooves 1136a and 1136b, nozzle 1068 may alternative include additional numbers of intermediate rings and recessed grooves so long as they continue to prevent tip end 1082 from functioning as a fully-planar bottom face. Furthermore, this embodiment may also be combined with a planar bottom face 1088 for inner ring 1090 discussed above for nozzle 68, the extended inner ring embodiment discussed above for nozzle 268 (shown in FIG. 11), with the planar bottom face 495 of outer ring 492 (of nozzle 468, shown in FIG. 12), and/or with the rounded or toroidal bottom face 695 of outer ring 694 (of nozzle 668, shown in FIG. 13).

Figure 16:
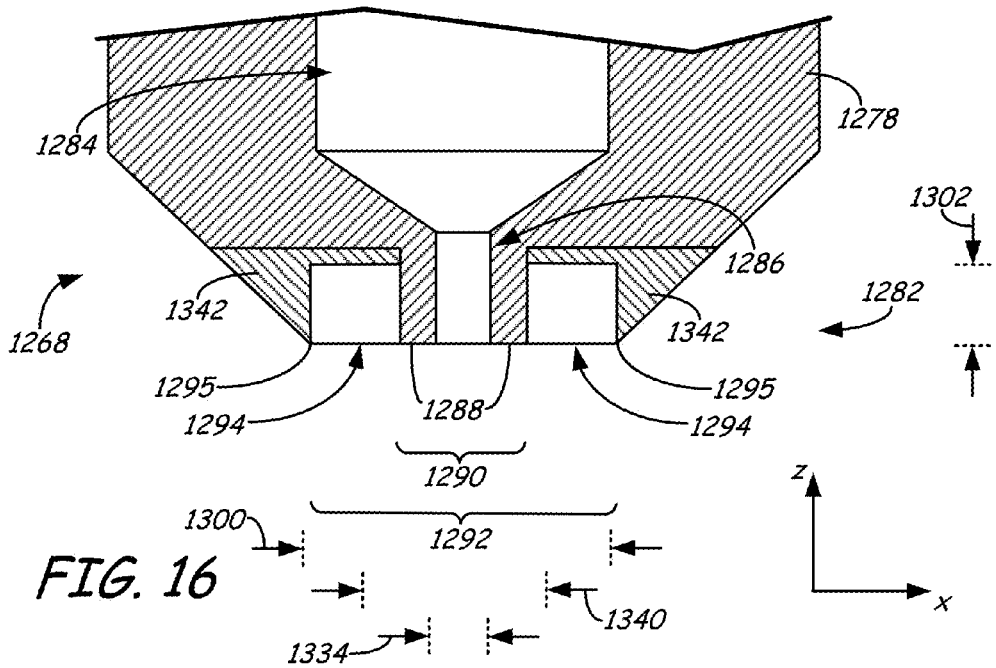
FIG. 16 is an expanded sectional view of a bottom portion of a sixth alternative nozzle of the present disclosure, which includes a removable outer ring.

As shown in FIG. 16, nozzle 1268 is similar to nozzle 68, except that outer ring 1292 is a separate component from nozzle body 1078 (referred to as ring component 1342), and may couple to nozzle body 1078 for use in the same manner as discussed above for nozzle 68. For example, ring component 1342 may be mechanically connected to nozzle body 1278 (e.g., screwed on), magnetically coupled to nozzle body 1278, and the like. Accordingly, tip end 1282 may include inner ring 1290, outer ring 1292 (removable and attachable to nozzle body 1278), and recessed groove 1294 (defined when outer ring 1292 is coupled to nozzle body 1278).

When ring component 1292 is coupled to nozzle body 1278, the relative locations of inner ring 1290 and outer ring 1292 define recessed groove 1294, which functions in the same manner as discussed above for recessed groove 94. Ring component 1342 allows nozzle 1268 to function either as a single-ring nozzle (when ring component 1342 is removed) or a multiple-ring nozzle (when ring component 1342 is coupled to tip body 1278). This also allows multiple ring components 1342 having different diameters for outer ring 1292 to be used. Additionally, ring component 1292 may be actuatable along the z-axis to allow outer ring 1292 to extend proud of inner ring 1290, and to retract upward when not being used. These embodiments may also be combined with any of the above-discussed embodiments for nozzles 268, 468, 668, 868, and/or 1068 wherein like elements are described with like reference characters for consistency with the embodiments described herein (e.g., reference characters 1284, 1286, 1288, 1295, 1300, 1302 1334, 1340).

In a further aspect of this embodiment, ring component 1342 may be interchangeable with a variety of ring components 1342, which may have the same dimensions or different dimensions (e.g., allowing different-sized outer rings to be interchangeably used). The various ring components 1342 may also be fabricated out of different materials, such as metallic materials (e.g., steel), ceramics, silicon, and/or polymers. In this instance, after a given printing duration (e.g., after a few hundred layers), a given ring component 1342 may be removed, and nozzle 1268 may be positioned over a dispenser, tray, turret, or other dispenser to retrieve a new ring component 1342 for use. For example, controller 60 may direct head gantry 46 to move print head 44 (having nozzle 1268) to a tip removal station in chamber 38, such as a station having a knife-shaped V-groove to mechanically remove ring component 1342 from nozzle body 1278. Alternatively, nozzle 1268 may be configured to eject ring component 1342. Controller 60 may then direct head gantry 46 to move print head to a dispensing station, where nozzle 1268 may retrieve a new ring component 1342 for subsequent printing operations.

Figure 17:
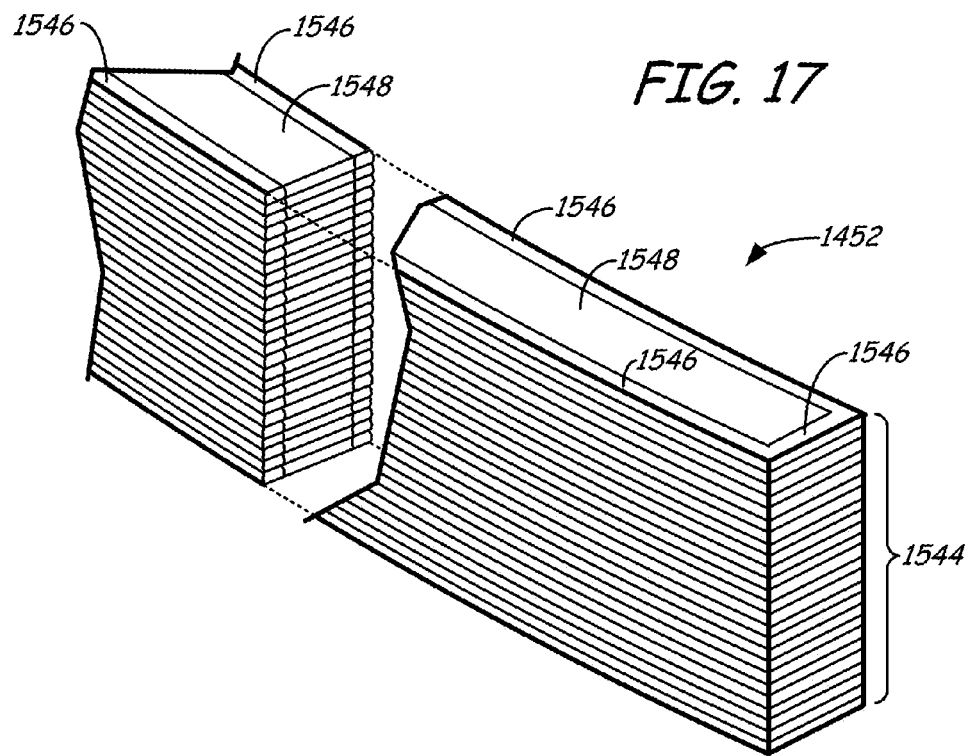
FIG. 17 is perspective view with a cut-out area of a thin-wall 3D part printed with an nozzle of the present disclosure, where each layer of the thin-wall 3D part has a narrow perimeter road and a wider interior fill road.

FIG. 17 is an illustration of an example thin-wall 3D part or support structure (referred to as 3D part 1452) that can be printed with the nozzles of the present disclosure. The following discussion of 3D part 1452 is made with reference to nozzle 68, with the understanding that 3D part 1452 may be printed from any suitable nozzles of the present disclosure. As shown in FIG. 17, 3D part 1452 includes a plurality of layers 1544, each printed from a perimeter road 1546 and an interior fill road 1548. 3D part 1452 may have any suitable thin-wall geometry, such as for large panel parts, vehicle skins (e.g., fuselages, doors, and hoods), airfoils, and the like.

Figure 18A:
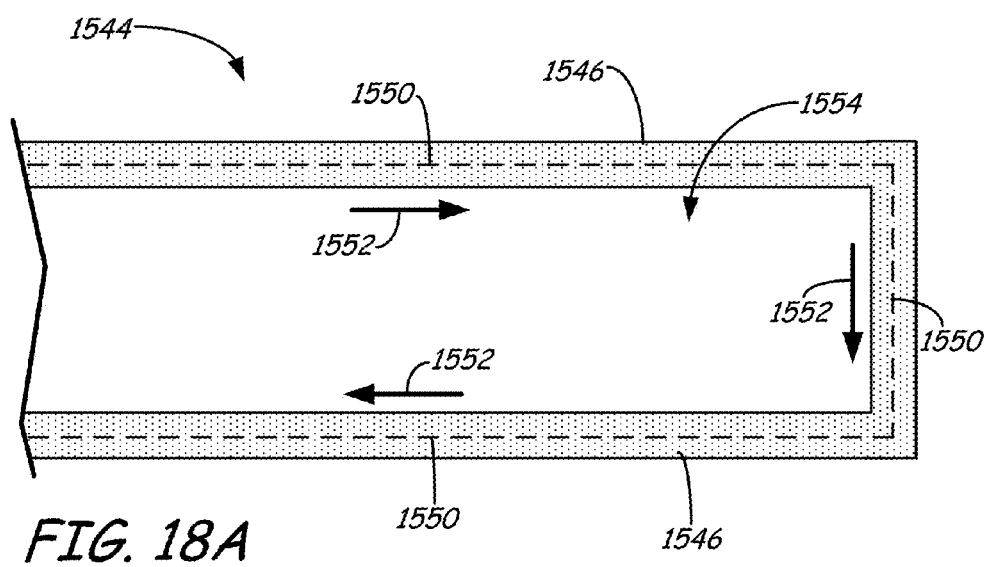
FIG. 18A is a top view a layer of the thin-wall 3D part, illustrating the printing of a perimeter road of the layer from the nozzle of the present disclosure, where the perimeter road defines an interior region of the layer.

As shown in FIG. 18A, a given layer 1544 may be formed by initially extruding a flowable part or support material from nozzle 68 at a first extrusion rate while nozzle 68 moves along tool path 1550, such as illustrated by arrows 1552. In particular, as discussed above, while being extruded at the first extrusion rate, the height of perimeter 1546 can be drawn down to a lower road height (e.g., road height 114) based on the pressure of the extruded flowable material below nozzle 68. This draw effect prevents outer ring 92 from contacting and interfering with the extruded flowable material.

As such, the extruded flowable material is guided by inner ring 90 (and not by outer ring 92) of nozzle 68 to produce a perimeter road 1546 having good road edge quality, with a road width comparable to outer diameter 98 of inner ring 90. Thus, the sidewalls of perimeter road do not ripple and remain at substantially constant distances from tool path 1550. This accordingly produces perimeter road 1546 having a narrow road width (e.g., road width 104), and which defines interior region 1554 for the given layer 1544.

Figure 18B:
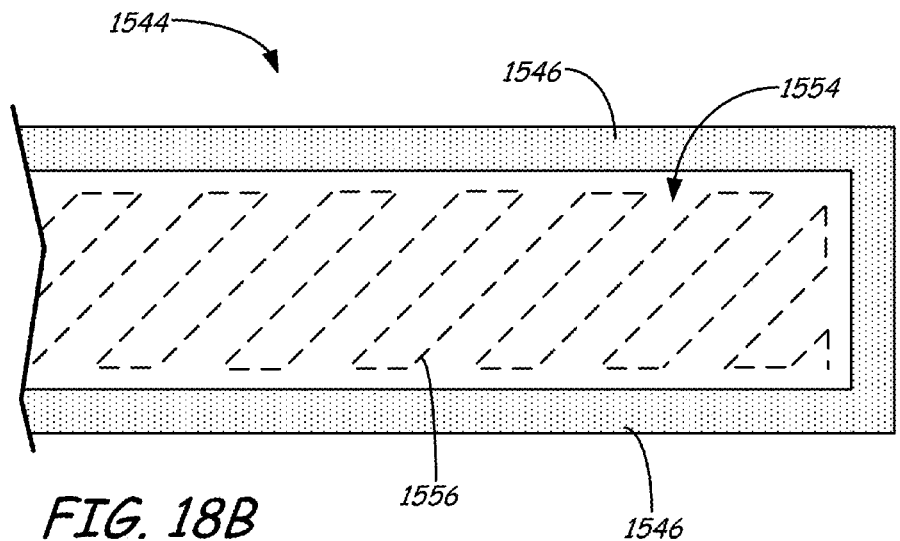
FIG. 18B is a top view the layer of the thin-wall 3D part, illustrating a raster tool path that is typically used when printing from a conventional nozzle to fill the interior region of the layer.

As shown in FIG. 18B, a conventional nozzle having a tip diameter corresponding to the road width of perimeter road 1546, would require multiples passes, such as along raster tool path 1556, to fill interior region 1554 with the flowable material. As can be appreciated, the back-and-forth movement of the print head increases the time required to fill interior region 1554.

Figure 18C:
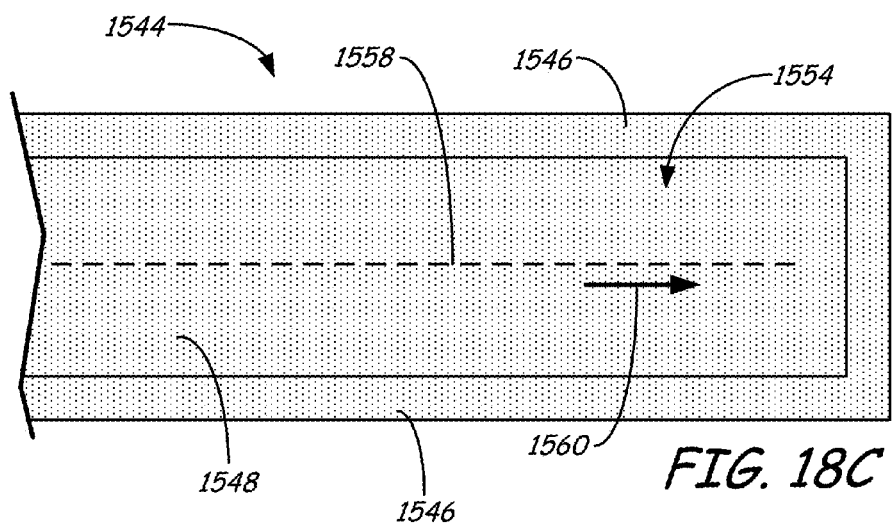
FIG. 18C is a top view the layer of the thin-wall 3D part, illustrating the printing of an interior fill road of the layer from the nozzle of the present disclosure, where the interior fill road fills the interior region of the layer.

Instead, as shown in FIG. 18C, nozzle 68 can extrude the flowable material at a second extrusion rate (that is greater than the first extrusion rate) while the extrusion head 68 moves along a single tool path 1558, such as illustrated by arrow 1560. As discussed above, increasing the extrusion rate causes the flowable material to flow laterally around inner ring 90 of nozzle 68 and into recessed groove 94 to outer ring 92. Outer ring 92, however, functions as a larger-diameter tip to guide the extruded flowable material.

As such, the extruded flowable material is guided by inner ring 90 and by outer ring 92 to produce a stable interior fill road 1548 having a road width comparable to diameter 100 of outer ring 92. Thus, the sidewalls of interior fill road 1548 do not oscillate and remain at substantially constant distances from tool path 1556. This produces interior fill road 1548 having a wider road width (e.g., road width 118) to fill interior region 1554.

The narrower perimeter road 1546 produced by inner ring 90 of nozzle 68 is generally more stable than the wider interior fill road 1548 produced by outer ring 92. However, because the perimeter of layer 1544 is defined by perimeter road 1546, and interior fill road 1548 fills interior region 1554 and is laterally supported by the previously-formed perimeter road 1546, the stability of interior fill road 1548 is less of a concern. Thus, interior fill road 1548 can have any suitable road width, such as from about the same width as outer diameter 98 of inner ring 90 to about 120% of diameter 100 of outer ring 92.

Comparing raster tool path 1556 (shown in FIG. 18B) and tool path 1558 (shown in FIG. 18C), it can be appreciated that replacing the back-and-forth raster printing with a single deposition path can reduce the time required to fill interior region 1554 for each layer 1544. Because the thin-wall geometry 3D part 1452 can have a large number of layers to provide a high-resolution surface, the use of nozzle 68 (or any alternative nozzle of the present disclosure) can substantially reduce the time to print 3D part 1452 or other 3D parts having thin-wall geometries.

The nozzles of the present disclosure can print narrow perimeter roads of a layer using inner ring 90, and then print a wider interior road using both inner ring 90 and outer ring 92 to fill the interior region between the perimeter roads. This eliminates the need for a raster fill of the interior region, which can be a time-consuming process. This is in addition to increased z-axis lamination strengths (due to the wider fill road 1548), as well as reduced porosity and sealing properties.

As can be appreciated from the above-discussed embodiments above, the nozzle of the present disclosure includes a bottom or outlet face with an inner ring and an outer ring, and at least one recessed groove between the inner and outer rings. This allows a single nozzle to produce stable roads having different road widths, thereby maintaining good surface quality for printed 3D parts and/or support structures.

EXAMPLES

The present disclosure is more particularly described in the following examples that are intended as illustrations only, since numerous modifications and variations within the scope of the present disclosure will be apparent to those skilled in the art.

Examples 1-6

Nozzles of Examples 1-6 were manufactured and mounted in an additive manufacturing system commercially available from Stratasys, Inc., Eden Prairie, Minn. under the trademarks "FDM" and "FORTUS 400mc". For each nozzle, 6-inch long, single-road walls were printed from a polycarbonate part material, where the single-road walls had wall thicknesses of 0.5 millimeters (0.02 inches), 1.0 millimeter (0.04 inches), 1.5 millimeters (0.06 inches), 2.0 millimeters (0.08 inches), and 2.5 millimeters (0.1 inches). Additionally, for each nozzle, a 6-inch×6-inch, single-road square wall was printed from the polycarbonate part material having a 2.5 millimeter (0.1 inch) wall thickness. Each printed wall and square was then visually inspected for surface cresting/rippling that was visible to the naked eye. The results were then ranked on a 1-5 scale as summarized in Table 1:

TABLE 1

| Rank | Description |
|---|---|
| 1 | High amount of visible cresting/rippling, low surface quality |
| 2 | Moderate amount of visible cresting/rippling |
| 3 | Low amount of visible cresting/rippling, still acceptable for aesthetic qualities |
| 4 | Very little amount of visible cresting/rippling |
| 5 | No visible cresting/rippling, high surface quality |

The nozzle of Example 1 corresponded to nozzle 68 having a planar-face, inner ring and a knife-edge, outer ring separated by an annular recessed groove. The inner and outer rings were flush with each other. The inner ring had an inner diameter of 400 micrometers (0.016 inches) and an outer diameter of 760 micrometers (0.03 inches). The outer ring had a diameter of 2,000 micrometers (0.08 inches). The recessed groove had a width (between the inner and outer rings) of 640 micrometers (0.025 inches) and a depth of 560 micrometers (0.022 inches). Table 2 lists the ranked results for the nozzle of Example 1:

TABLE 2

| Wall thickness/road width | Example 1 Surface Quality Rank |
|---|---|
| 0.5 millimeters (0.02 inches) | 5 |
| 1.0 millimeter (0.04 inches) | 3 |
| 1.5 millimeters (0.06 inches) | 1 |
| 2.0 millimeters (0.08 inches) | 3 |
| 2.5 millimeters (0.1 inches) | 3 |
| 2.5 millimeters (0.1 inches) (square wall) | 3 |

The nozzle of Example 2 corresponded to nozzle 268 (shown in FIG. 11) having a planar-face, inner ring and a knife-edge, outer ring separated by an annular recessed groove. The nozzle of Example 2 had the same dimensions as the nozzle of Example 1, except that the inner ring was proud of the outer ring by 80 micrometers (0.003 inches). Table 3 lists the ranked results for the nozzle of Example 2:

TABLE 3

| Wall thickness/road width | Example 2 Surface Quality Rank |
|---|---|
| 0.5 millimeters (0.02 inches) | 5 |
| 1.0 millimeter (0.04 inches) | 4 |

TABLE 3-continued

| Wall thickness/road width | Example 2 Surface Quality Rank |
|---|---|
| 1.5 millimeters (0.06 inches) | 1 |
| 2.0 millimeters (0.08 inches) | 1 |
| 2.5 millimeters (0.1 inches) | 3 |
| 2.5 millimeters (0.1 inches) (square wall) | 3 |

The nozzle of Example 3 corresponded to nozzle 468 (shown in FIG. 12) having a planar-face, inner ring and a planar-face, outer ring separated by an annular recessed groove. The inner and outer rings were flush with each other. The inner ring had an inner diameter of 16 mils and an outer diameter of 760 micrometers (0.03 inches). The outer ring had an inner diameter of 1,800 micrometers (0.07 inches) and an outer diameter of 2,000 micrometers (0.08 inches). The recessed groove had a width (between the inner and outer rings) of 500 micrometers (0.02 inches) and a depth of 560 micrometers (0.022 inches). Table 4 lists the ranked results for the nozzle of Example 3:

TABLE 4

| Wall thickness/road width | Example 3 Surface Quality Rank |
|---|---|
| 0.5 millimeters (0.02 inches) | 3 |
| 1.0 millimeter (0.04 inches) | 2 |
| 1.5 millimeters (0.06 inches) | 1 |
| 2.0 millimeters (0.08 inches) | 1 |
| 2.5 millimeters (0.1 inches) | 3 |
| 2.5 millimeters (0.1 inches) (square wall) | 3 |

The nozzle of Example 4 had a planar-face, inner ring and a planar-face, outer ring separated by an annular recessed groove. The nozzle of Example 4 had the same dimensions as the nozzle of Example 3, except that the inner ring was proud of the outer ring by 80 micrometers (0.003 inches). Table 5 lists the ranked results for the nozzle of Example 4:

TABLE 5

| Wall thickness/road width | Example 4 Surface Quality Rank |
|---|---|
| 0.5 millimeters (0.02 inches) | 5 |
| 1.0 millimeter (0.04 inches) | 4 |
| 1.5 millimeters (0.06 inches) | 1 |
| 2.0 millimeters (0.08 inches) | 1 |
| 2.5 millimeters (0.1 inches) | 3 |
| 2.5 millimeters (0.1 inches) (square wall) | 3 |

The nozzle of Example 5 corresponded to nozzle 668 (shown in FIG. 13) having a planar-face, inner ring and a rounded or toroidal, outer ring separated by an annular recessed groove. The inner and outer rings were flush with each other. The inner ring had an inner diameter of 400 micrometers (0.016 inches) and an outer diameter of 760 micrometers (0.03 inches). The outer ring had an inner diameter of 1,800 micrometers (0.07 inches) and an outer diameter of 2,000 micrometers (0.08 inches). The recessed groove had a width (between the inner and outer rings) of 500 micrometers (0.02 inches) and a depth of 560 micrometers (0.022 inches). Table 6 lists the ranked results for the nozzle of Example 5:

TABLE 6

| Wall thickness/road width | Example 5 Surface Quality Rank |
|---|---|
| 0.5 millimeters (0.02 inches) | 4 |
| 1.0 millimeter (0.04 inches) | 2 |
| 1.5 millimeters (0.06 inches) | 1 |
| 2.0 millimeters (0.08 inches) | 3 |
| 2.5 millimeters (0.1 inches) | 3 |
| 2.5 millimeters (0.1 inches) (square wall) | 3 |

The nozzle of Example 6 had a planar-face, inner ring and a rounded or toroidal, outer ring separated by an annular recessed groove. The nozzle of Example 6 had the same dimensions as the nozzle of Example 5, except that the inner ring was proud of the outer ring by 80 micrometers (0.003 inches). Table 7 lists the ranked results for the nozzle of Example 6:

TABLE 7

| Wall thickness/road width | Example 6 Surface Quality Rank |
|---|---|
| 0.5 millimeters (0.02 inches) | 5 |
| 1.0 millimeter (0.04 inches) | 5 |
| 1.5 millimeters (0.06 inches) | 1 |
| 2.0 millimeters (0.08 inches) | 1 |
| 2.5 millimeters (0.1 inches) | 3 |
| 2.5 millimeters (0.1 inches) (square wall) | 3 |

As shown by the results in Tables 2-7, the nozzles of Examples 1-6 were suitable for printing narrow roads and wide roads with good surface qualities, and generally followed the trend shown above in FIG. 10. In particular, the nozzle of Example 1, corresponding to nozzle 68, produced stable roads at both 0.5-1.0 millimeter widths and at 2.0-2.5 millimeter widths. As such, having the inner and outer rings flush with each other (i.e., not having the inner ring proud of the outer ring), and have the outer tip with a knife-edge face are beneficial for providing stable narrow and wide roads.

The nozzle of Example 1 was also installed into an additive manufacturing system commercially available from Stratasys, Inc., Eden Prairie, Minn. under the trademarks "FDM" and "FORTUS 900mc". The nozzle was then used to print a scaled-down car hood from a polycarbonate part material having a 3 millimeter-wide (0.12 inch-wide) wall, along with a stabilizing ribbon scaffold as disclosed in co-filed U.S. patent application Ser. No. 13/587,012, entitled "Method For Printing Three-Dimensional Parts With Additive Manufacturing Systems Using Scaffolds".

Each layer of the printed hood was printed with a 3 millimeter (0.12 inch-wide) wall thickness, which included two 0.5 millimeter-wide (0.02 inch-wide) perimeter roads followed by a 2 millimeter-wide (0.08 inch-wide) internal fill road. Each layer of the stabilizing ribbon scaffold was printed as a 1-millimeter (0.04 inch) single-road wall.

Figure 19:
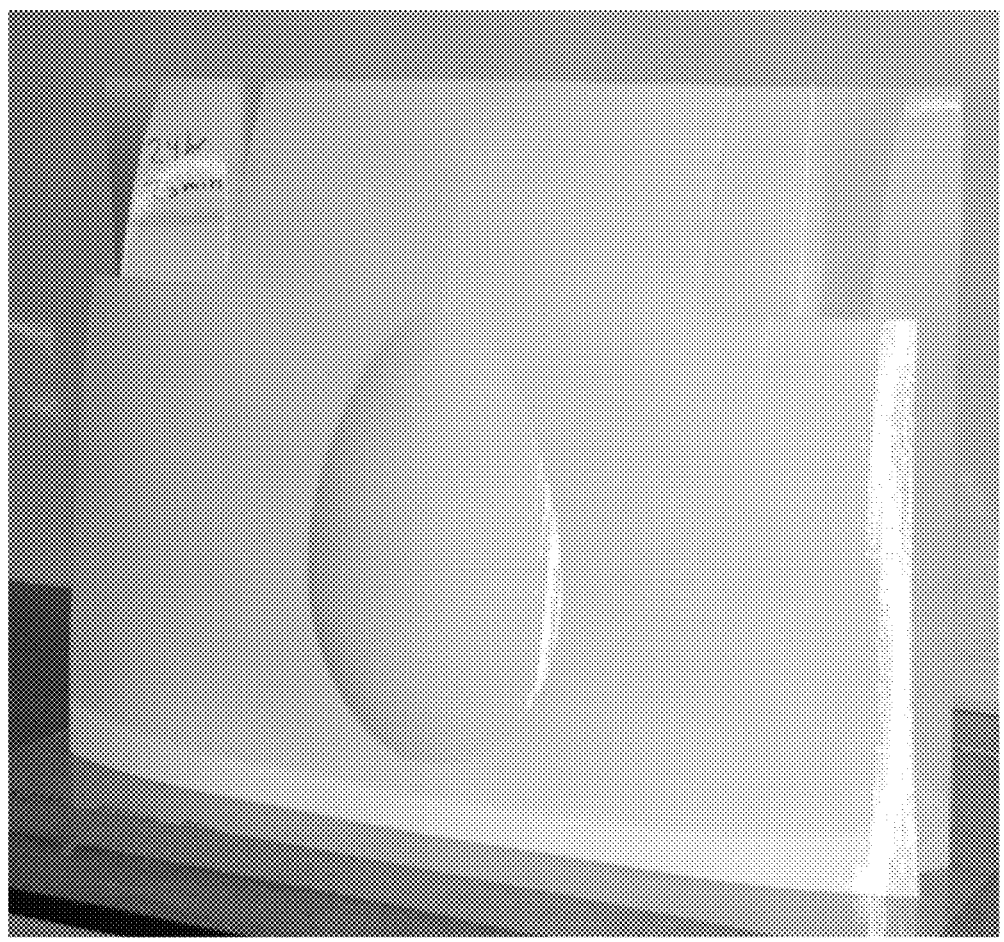
FIG. 19 is a photograph of a 3D part printed with an example nozzle of the present disclosure.

The resulting hood is shown in FIG. 19, and was 35 inches (about 89 centimeters) wide and 27 inches (about 69 centimeters) tall. The additive manufacturing system with the nozzle of Example 1 printed the entire hood in 24 hours and 25 minutes. In comparison, a standard printing operation with a conventional nozzle suitable for printing 0.5 millimeter-wide (0.02 inch-wide) wide roads, requires about 76 hours to print the shown hood. As such, the printing time was reduced by more than a factor of three.

This reduced printing time was achievable because the interior fill road of each layer was printed in a single pass, rather than with a raster pattern. Additionally, the resulting hood did not have any visible cresting/rippling. Moreover, it is believed that the time required to print the hood shown in FIG. 19 can be even further reduced by increasing the extrusion rate of the part material, while maintaining good surface quality.

Comparative Example A

The nozzle of Comparative Example A corresponded to nozzle 10 (shown in FIGS. 1A-1C) having a single bottom face. The bottom face had an inner diameter of 400 micrometers (0.016 inches) and an outer diameter of 760 micrometers (0.03 inches). The nozzle was mounted in an additive manufacturing system commercially available from Stratasys, Inc., Eden Prairie, Minn. under the trademarks "FDM" and "FORTUS 400mc", and used to print 3D parts.

The nozzle was capable of printing stable narrow roads having road widths ranging from about 500 micrometers (0.02 inches) to about 1,000 micrometers (0.04 inches). However, the nozzle was not capable of printing stable roads having road widths greater than about 1,000 micrometers (0.04 inches) without having the part material curl up around the lateral edges of the nozzle. As such, the nozzle of Comparative Example A was not suitable for printing both narrow and wide roads (e.g., narrow perimeter roads and wider interior fill roads).

Comparative Example B

The nozzle of Comparative Example B corresponded to nozzle 10a (shown in FIGS. 2A-2C). The bottom face of the nozzle had an inner diameter of 400 micrometers (0.016 inches) and an outer diameter of 2,000 micrometers (0.08 inches). The nozzle was also mounted in an additive manufacturing system commercially available from Stratasys, Inc., Eden Prairie, Minn. under the trademarks "FDM" and "FORTUS 400mc", and used to print 3D parts.

The nozzle was capable of printing stable wide roads having road widths ranging from about 2,000 micrometers (0.08 inches) to about 2,500 micrometers (0.10 inches). However, the nozzle was not capable of printing stable roads having road widths less than about 2,000 micrometers (0.08 inches) without propagating substantial amounts of cresting, as shown in FIGS. 20 and 21. As such, the nozzle of Comparative Example B was also not suitable for printing both narrow and wide roads (e.g., narrow perimeter roads and wider interior fill roads).

Accordingly, the nozzles of the present disclosure are suitable for printing both narrow and wide stable roads. The use of a tip end having an inner ring and an outer ring separated by a recessed groove takes advantage of the draw down effect that can occur when printing roads of 3D parts, as discussed in co-filed U.S. patent application Ser. No. 13/587,006, entitled "Draw Control For Extrusion-Based Additive Manufacturing". This allows a single nozzle to print both narrow perimeter roads and wider interior fill roads, thereby reducing overall printing times and increasing 3D-part throughput.

Although the present disclosure has been described with reference to preferred embodiments, workers skilled in the art will recognize that changes may be made in form and detail without departing from the spirit and scope of the disclosure.

The invention claimed is:

1. A nozzle for use with a print head in an extrusion-based additive manufacturing system, the nozzle comprising: an inlet end configured to be secured to a flow channel of the print head; a tip end offset longitudinally from the inlet end; a tip pipe extending longitudinally at least part way between the inlet end to the tip end; the tip end comprising: an outlet port of the tip pipe configured to extrude molten material from the print head, the outlet port having a first diameter; an inner ring having a second diameter that is larger than the first diameter, wherein the inner ring is substantially concentric and co-planar with the outlet port, wherein the first diameter and the second diameter define a substantially planar surface therebetween; an outer ring comprising a knife edge having a third diameter at the knife edge that is larger than the second diameter, wherein the outer ring is substantially concentric and co-planar with the inner ring; and at least one annular recessed groove having an opening located between the inner ring and the outer ring, wherein the nozzle is configured to produce smooth extruded roads of material having a first width and a second width, wherein the first width is substantially that of the second diameter and the second width is substantially that of the third diameter, wherein the at least one annular recessed groove is configured to accept a flowable material extruded from the outlet port such that at least a portion of the extruded flowable material is accepted by the at least one annular recessed groove such that the extruded flowable material contacts and is guided by the outer ring to form the road of material and the second width.

2. The nozzle of claim 1, wherein the second diameter ranges from about 500 micrometers to about 1,300 micrometers.

3. The nozzle of claim 1, wherein the third diameter ranges from about 1,500 micrometers to about 2,500 micrometers.

4. The nozzle of claim 1, wherein the outer ring is configured to be removably coupled to the tip end.

5. The nozzle of claim 1, wherein the tip pipe has a longitudinal length and the first diameter, and wherein a ratio of the longitudinal length to the first diameter of the tip pipe ranges from about 1:2 to about 5:1.

6. A print head for use in an extrusion-based additive manufacturing system, the print head comprising: a flow channel having an inlet end and an outlet end, the inlet end of the flow channel being configured to receive a consumable material; a heating element for heating the consumable material in the flow channel to a temperature at which the consumable material is flowable; and a nozzle comprising: an inlet end coupled to or integrally formed with the outlet end of the flow channel; a tip end offset longitudinally from the inlet end of the nozzle; a tip pipe having an exit port proximate the tip end, the exit port having a first diameter and being configured to extrude the flowable consumable material received from the flow channel; an inner ring substantially concentric with the exit port at the tip end of the nozzle, the inner ring having a second diameter that is larger than the first diameter, wherein the first and second diameters define a substantially planar surface therebetween; an outer ring spaced from and substantially coplanar and concentric with the inner ring, wherein the outer ring comprises a knife edge having a third diameter at the knife edge that is larger than the second diameter; and at least one annular recessed groove located between the inner ring and the outer ring, wherein the nozzle is configured to produce smooth extruded roads of material having a first width and a second width, wherein the first width is substantially that of the second diameter and the second width is substantially that of the third diameter, wherein the at least one annular recessed groove is configured to accept a portion of the flowable consumable material extruded from the exit port when a flow rate of the flowable material creates a back pressure between the nozzle and a previously accepted layer of a 3D part such that the portion of the extruded flowable consumable material is accepted by the at least one annular recessed groove and wherein the extruded flowable material contacts the outer ring and is guided by the outer ring to form the road having substantially the third diameter.

7. The print head of claim 6, wherein the second diameter ranges from about 500 micrometers to about 1,300 micrometers.

8. The print head of claim 6, wherein the third diameter ranges from about 1,500 micrometers to about 2,500 micrometers.

9. The print head of claim 6, wherein the at least one annular recessed groove has a radial width between the inner ring and the outer ring of at least about 760 micrometers.

10. A nozzle for use with a print head in an extrusion-based additive manufacturing system, the nozzle comprising: a main body having a first end and a second end; a flow channel through the main body from the first end to the second end wherein the flow channel at the second end defines an extrusion port configured to extrude a molten material, wherein the extrusion port has a first diameter; an inner ring at the second end, the inner ring having a second diameter being larger than the first diameter, the inner ring being substantially co-planar and concentric with the extrusion port; an outer ring at the second end, the outer ring being substantially co-planar and concentric with the inner ring, wherein the outer ring comprises a knife edge having a third diameter at the knife edge that is larger than the second diameter; and a first annular recess within the second end of the main body and having an opening located in the second end, wherein the first annular recess is concentric with the extrusion port, wherein the first annular recess is positioned between the inner ring and the outer ring, wherein the nozzle is configured to produce smooth extruded roads of material having a first width and a second width, wherein the first width is substantially that of the second diameter and the second width is substantially that of the third diameter, and wherein the first annular recess is configured to accept a portion of the molten material extruded from the extrusion port when a flow rate of the flowable material creates a back pressure between the nozzle and a previously accepted layer of a 3D part such that the portion of the extruded molten material is accepted by the first annular recess and wherein the extruded flowable material contacts and is guided by the outer ring to form the road of material having substantially the width of the third diameter.

11. The nozzle of claim 10 and wherein the second end of the nozzle comprises a substantially flat surface between the extrusion port and the first annular recess.

* * * * *